(12) United States Patent
Grosse

(10) Patent No.: US 9,764,900 B2
(45) Date of Patent: Sep. 19, 2017

(54) AUTOMATIC RACK STORAGE SYSTEM

(71) Applicant: TGW Logistics Group GmbH, Wels (AT)

(72) Inventor: Eric Grosse, Langen (DE)

(73) Assignee: TGW Logistics Group GmbH, Wels (AT)

( * ) Notice: Subject to any disclaimer, the term of this patent is extended or adjusted under 35 U.S.C. 154(b) by 16 days.

(21) Appl. No.: 14/914,700

(22) PCT Filed: Aug. 26, 2014

(86) PCT No.: PCT/AT2014/050183
§ 371 (c)(1),
(2) Date: Jun. 1, 2016

(87) PCT Pub. No.: WO2015/027261
PCT Pub. Date: Mar. 5, 2015

(65) Prior Publication Data
US 2016/0297610 A1   Oct. 13, 2016

(30) Foreign Application Priority Data

Aug. 27, 2013  (AT) .............................. A 50526/2013

(51) Int. Cl.
*G06F 7/00* (2006.01)
*B65G 1/04* (2006.01)
(Continued)

(52) U.S. Cl.
CPC .............. *B65G 1/0492* (2013.01); *B60L 5/40* (2013.01); *B60M 1/34* (2013.01)

(58) Field of Classification Search
None
See application file for complete search history.

(56) References Cited

U.S. PATENT DOCUMENTS 3,417,879 A   12/1968  Gough
3,880,264 A    4/1975  Corkum
(Continued)

FOREIGN PATENT DOCUMENTS

AU   2011275902 B2   1/2012
DE    21 13 201 A1   9/1972
(Continued)

OTHER PUBLICATIONS

International Search Report of PCT/AT2014/050183, dated Jan. 28, 2015.

*Primary Examiner* — Yolanda Combess
(74) *Attorney, Agent, or Firm* — Collard & Roe, P.C.

(57) ABSTRACT

The invention relates to a rack storage system comprising a storage rack (1) with storage shelves (12a, 12b) having storage spaces (17) for articles in rack stages (16) lying one above the other with a rack aisle (15) extending in between. Several guide tracks with first and second guide rails run along the rack aisle (15) (27, 28). First and second conveyor vehicles (3a, 3b) can be moved on the guide tracks, each of the conveyor vehicles (3a, 3b) having a drive motor (65a, 65b) and an electronic control unit (66a, 66b) and being controllable independently of one another. The first guide rail (27) is equipped with a first contact line arrangement (67) and the second guide rail (28) is equipped with a second contact line arrangement (68), each of the contact line arrangements (67, 68) comprising dedicated contact lines (69, 70). For energy and/or data supplying purposes, current collectors (71a) of the first conveyor vehicle (3a) contact the contact lines (69) of the first contact line arrangement (67) and current collectors (71b) of the second conveyor vehicle (3b) contact the contact lines (70) of the second contact line arrangement (68). The first conveyor vehicle (3a) and the second conveyor vehicle (3b) can be moved simultaneously (Continued)

Figure 1:
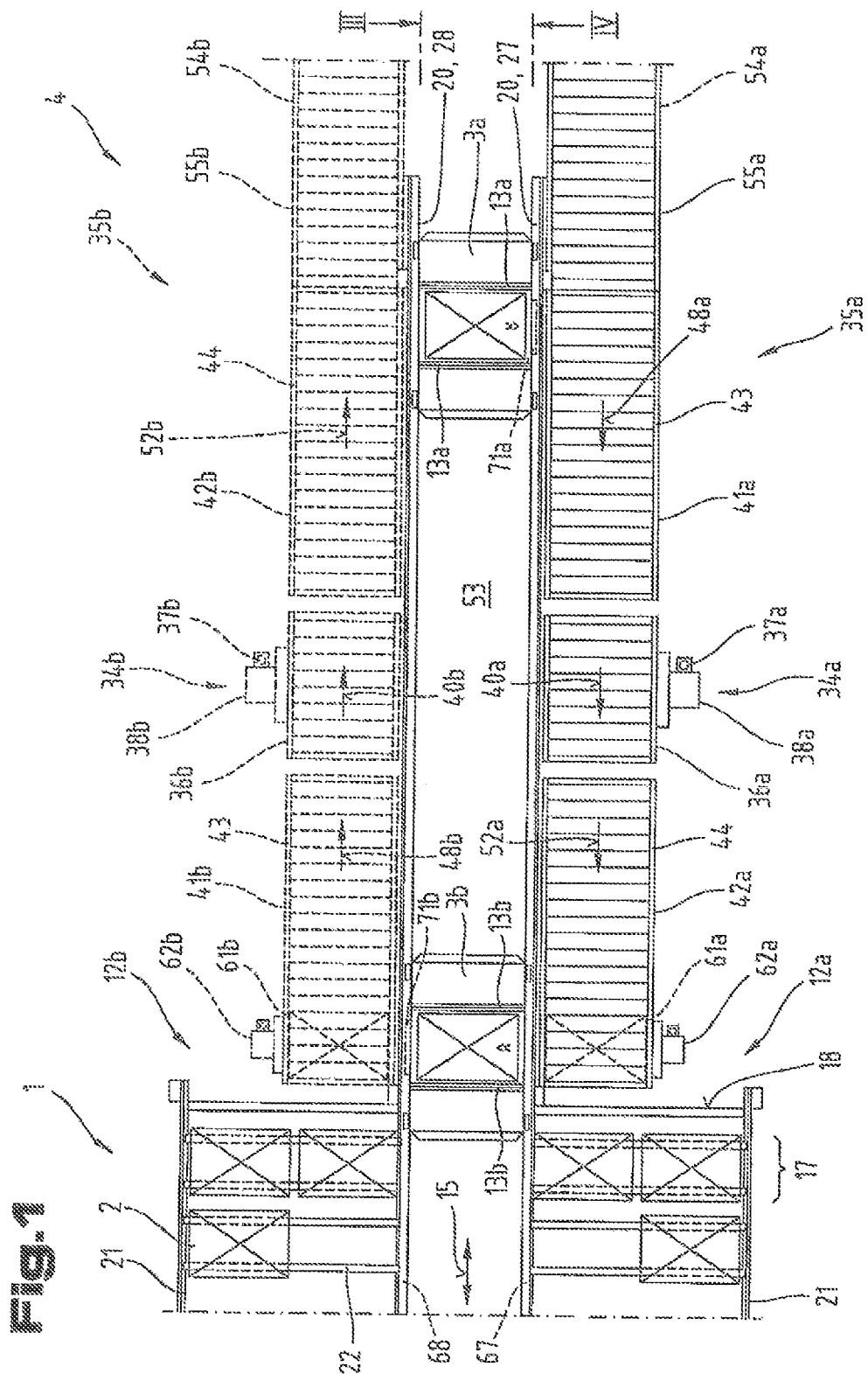

and independently of one another on the same conveying track.

23 Claims, 9 Drawing Sheets

(51) Int. Cl.
  *B60M 1/34* (2006.01)
  *B60L 5/40* (2006.01)

(56) References Cited

U.S. PATENT DOCUMENTS

| | | | |
|---|---|---|---|
| 5,333,982 | A | 8/1994 | Tanizawa et al. |
| 5,839,872 | A | 11/1998 | Goto et al. |
| 7,735,624 | B2 | 6/2010 | Koide et al. |
| 8,974,168 | B2 | 3/2015 | Yamashita |
| 2002/0182035 | A1* | 12/2002 | Karlen ............... B63B 25/22 414/143.2 |
| 2005/0053450 | A1 | 3/2005 | Kantola et al. |
| 2005/0095095 | A1 | 5/2005 | Hansl |
| 2008/0269960 | A1* | 10/2008 | Kostmann ........... B65G 1/0407 701/2 |
| 2012/0328397 | A1* | 12/2012 | Yamashita .......... B65G 1/065 414/282 |
| 2014/0236343 | A1* | 8/2014 | Hill ................ B65G 1/1378 700/216 |
| 2015/0336741 | A1 | 11/2015 | Ahammer et al. |

FOREIGN PATENT DOCUMENTS

| | | |
|---|---|---|
| DE | 21 13 202 A1 | 10/1972 |
| DE | 42 17 084 A1 | 11/1992 |
| DE | 10 2010 030 998 A1 | 1/2012 |
| EP | 0 647 575 A1 | 4/1995 |
| EP | 0 733 563 A1 | 9/1996 |
| EP | 1 254 852 A1 | 11/2002 |
| EP | 1 512 661 A1 | 3/2005 |
| EP | 1 775 240 A2 | 4/2007 |
| EP | 2 287 093 A1 | 2/2011 |
| EP | 2 543 611 A1 | 1/2013 |
| JP | 2004-123240 A | 4/2004 |
| WO | 2011/108636 A1 | 9/2011 |
| WO | 2012/004163 A2 | 1/2012 |
| WO | 2012/083333 A2 | 6/2012 |
| WO | 2012/106746 A1 | 8/2012 |
| WO | 2013/006879 A2 | 1/2013 |
| WO | 2013/090958 A1 | 6/2013 |
| WO | 2013/090970 A2 | 6/2013 |

* cited by examiner

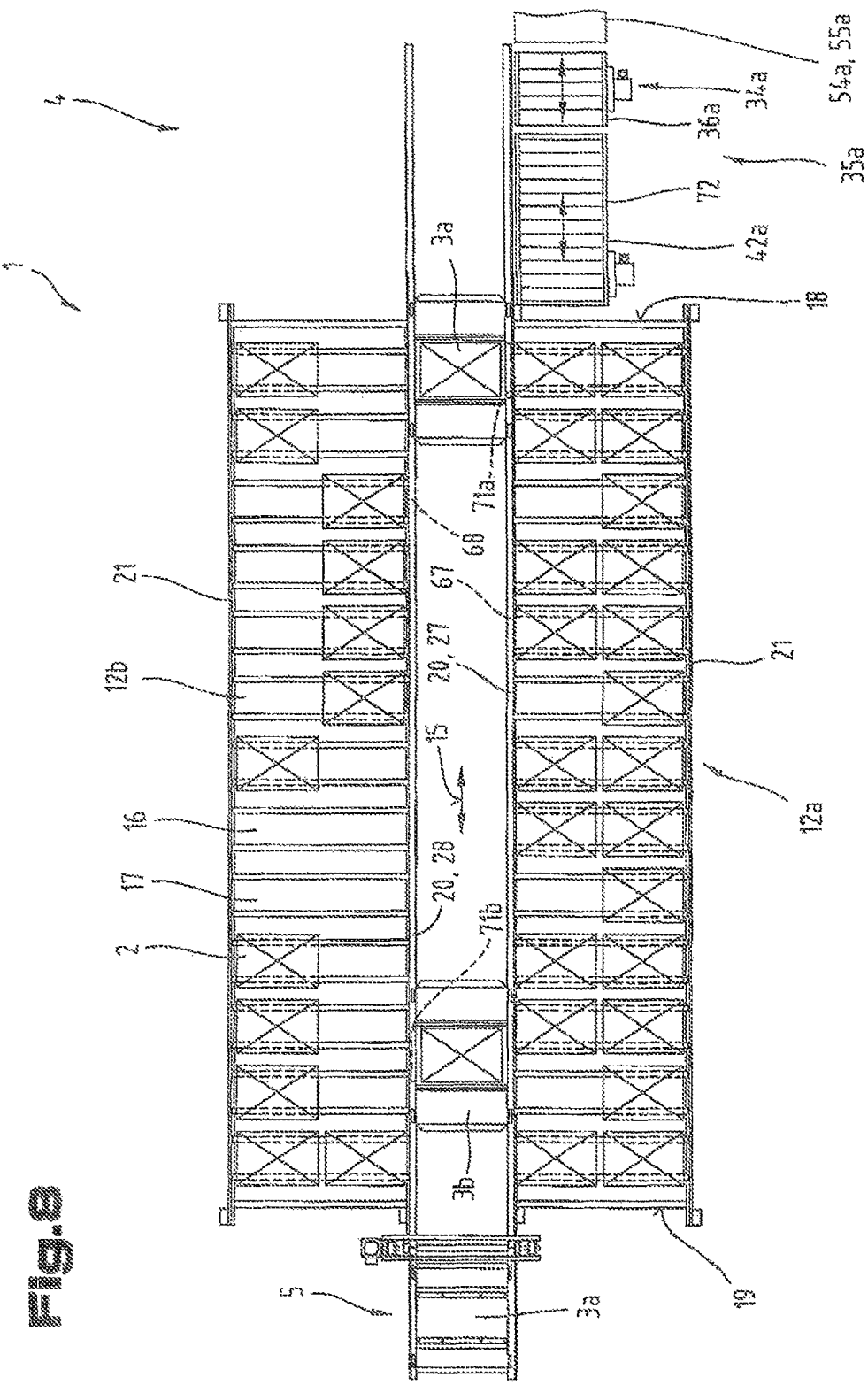

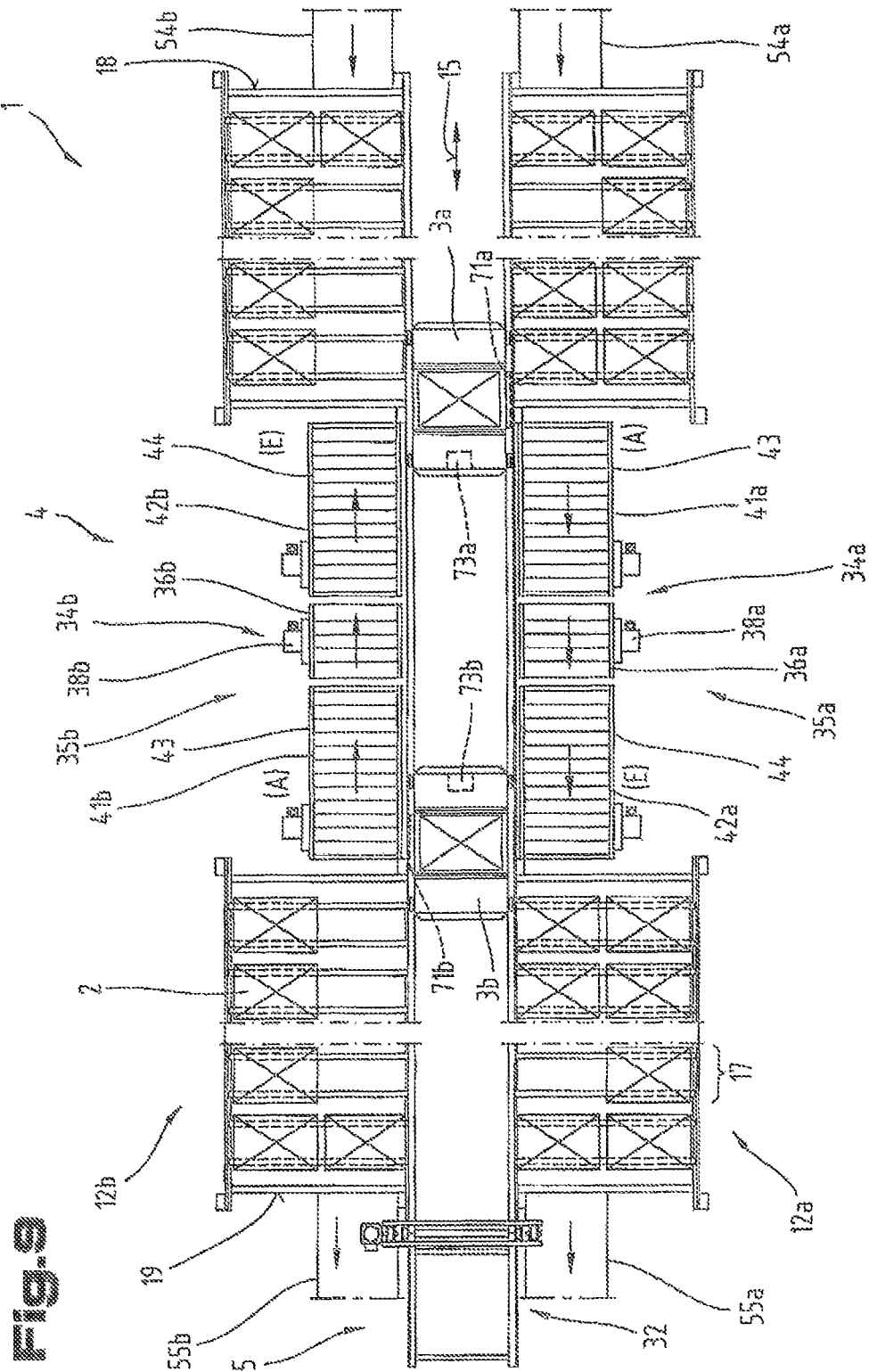

AUTOMATIC RACK STORAGE SYSTEM

CROSS REFERENCE TO RELATED APPLICATIONS

This application is the National Stage of PCT/AT2014/050183 filed on Aug. 26, 2014, which claims priority under 35 U.S.C. §119 of Austrian Application No. A 50526/2013 filed on Aug. 27, 2013, the disclosure of which is incorporated by reference. The international application under PCT article 21(2) was not published in English.

The invention relates to an automatic rack storage system.

EP 2 287 093 A1 describes a rack storage system and a method of operating this rack storage system. The rack storage system comprises a storage rack comprising several adjacently disposed rack rows with rack aisles extending between adjacent rack rows. The rack rows respectively form several rack stages in the vertical direction. One or more conveyor vehicles may be provided in each of the rack stages of every rack aisle. The conveyor vehicles are used to accommodate and transport aids such as pallets, containers and such like, which can be filled with products to be stored in and taken out of the rack rows. Guide tracks for guiding the conveyor vehicles are also provided in the rack aisles on at least individual ones of the rack stages.

WO 2011/108636 A1 and/or EP 2 543 611 A1 describe a rack storage system, comprising a storage rack with adjacently disposed storage shelves and guide tracks extending along a rack aisle for conveyor vehicles for accommodating and transporting articles in rack stages disposed one above the other, an article elevator device, a first buffer device and a second buffer device. The first buffer device and second buffer device are disposed on either side of the rack aisle. Each of these buffer devices comprises waiting devices in the form of accumulation conveyor devices in at least some of the rack stages. The conveyors of the accumulation conveyor devices of each buffer device can either operate in the same direction or in opposite directions so that, based on a first embodiment, the waiting devices of the first buffer device work exclusively on retrieval operations and the waiting devices of the second buffer device work exclusively on storage operations. Based on a second embodiment, the retrieval waiting devices and storage waiting devices of the first buffer device and the storage waiting devices and retrieval waiting devices of the second buffer device work alternately on both operations. The article elevator device comprises a stationary mast fixedly positioned in the extension of the rack aisle facing the storage rack or inside the rack aisle and a conveyor device mounted on it which can be raised and lowered for storing and/or retrieving articles. The articles can be conveyed between the first/second conveyor device and the respective accumulation conveyor device of the first/second buffer device. The article elevator device is connected to a conveyor system for transporting articles to and/or from the article elevator device in such a way that articles can be conveyed between the first/second conveyor device and the conveyor system.

If the article elevator device and its mast are disposed in the rack aisle and the first buffer device, second buffer device and storage rack are disposed respectively on either side of it, the guide tracks extend through the rack stages as far as the buffer devices. Two conveyor vehicles can travel in each rack stage in such a way that the first conveyor vehicle serves exclusively the waiting devices of the (left-hand) first/second buffer device and the second conveyor vehicle serves exclusively the waiting devices of the (right-hand) first/second buffer device. The mast in the rack aisle bounds the maximum travel path of the conveyor vehicles.

If a fault occurs, for example on the (left-hand) first conveyor vehicle, the waiting devices of the first/second buffer device rack stage can no longer be operated because the (right-hand) second conveyor vehicles are not able to operate the (left-hand) waiting devices of the first/second buffer device. This results in a stoppage which is very problematic, especially when operating in retrieval mode.

DE 10 2010 030 998 A1 discloses a rack storage system with guide tracks for conveyor vehicles and a method of operating it. The conveyor vehicles are supplied with electric current via a contact line arrangement. Furthermore, the conveyor vehicles are also supplied with data from a central control system by means of the same contact line arrangement. The contact line arrangement for the data supply can also be subdivided into in several sections and one or more conveyor vehicles is/are disposed in each section simultaneously and each section is supplied with only the data for the respective conveyor vehicles.

EP 0 733 563 A1 describes an embodiment of a rack storage system with a storage rack having storage shelves with storage spaces for articles in rack stages disposed one above the other. A rack aisle extends between the storage shelves and a merchandise handling unit for storing and retrieving merchandise is disposed at the storage rack ends respectively. The merchandise handling unit can also be integrated within the storage racks and may comprise article elevator devices disposed on either side of the rack aisle. Only a single autonomous conveyor vehicle is provided in each rack stage of the rack aisle.

DE 42 17 084 A1 discloses an automated rack storage system in which several electrically driven conveyor vehicles are provided in a rack aisle and in several rack stages between two rack rows. Disposed on a level with every rack stage is a pair of rails with a right and left guide rail in order to guide the conveyor vehicles. Each rack stage is provided with a single conveyor vehicle. The system comprises power supply wires on the right-hand guide rail for supplying the conveyor vehicles with power and control signal transmission wires on the left-hand guide rail for supplying the conveyor vehicles with data. The conveyor vehicle is provided with collector units on both longitudinal sides, of which the right collector unit is able to slide on the power supply wires and the left collector unit is able to slide on the control signal transmission wires.

Other rack storage systems are also known from DE 2 113 201 A1, DE 2 113 202 A1 and JP 2004-123240 A.

The underlying objective of this invention is to ensure that even when deploying two conveyor vehicles respectively in one of the rack stages, not only is there a fault-free power supply but also a clear allocation of the control signals for driving every individual one of the conveyor vehicles when operating both of the conveyor vehicles simultaneously.

The objective is achieved by the invention on the basis of the features described herein. The advantages achieved are that by providing contact line arrangements separately from one another to the side of the rack aisle on the guide rails for each of the conveyor vehicles extending on the storage shelves, it is possible to provide a dedicated power supply and/or data supply. Accordingly, the first conveyor vehicle can contact the contact lines of the first contact line arrangement via its current collector. The second conveyor vehicle can in turn contact the contact lines of the second contact line arrangement via its current collector. This enables the contact line arrangements to be run spatially separated from one another on both of the guide rails forming the guide track. The contact line arrangements are of identical construction and/or layout and each fulfils the same functions. Either both contact line arrangements are used to provide the conveyor vehicles disposed on one rack stage exclusively with the power supply or the data supply. Alternatively, both contact line arrangements are also used to provide the conveyor vehicles disposed on one rack stage with the power supply and data supply respectively. Based on a preferred variant, two conveyor vehicles at most are provided on a rack stage so that one contact line arrangement is assigned specifically to one each of the conveyor vehicles. This being the case, each of the conveyor vehicles can be provided with a sufficient amount of power to drive it independently of the other conveyor vehicle via the two contact line arrangements when they are on the same rack stage. Alternatively, each of the conveyor vehicles can also be supplied with only those data and/or control signals specifically intended for the respective conveyor vehicle via the two contact line arrangements when they are on the same rack stage. As a result, faults during a data transmission across the contact line arrangements between the individual conveyor vehicles and a central control system can be prevented. This enables secure simultaneous operation of two conveyor vehicles in in the same rack stage independently of one another.

Also of advantage is an embodiment defined in which each contact line arrangement is provided with two mutually separate contact lines by means of which the respective contacted conveyor vehicle can be supplied with power and/or data on an independent basis. It has proved to be of particular advantage to provide at most three contact lines per contact line arrangement, preferably exclusively two contact lines per contact line arrangement, which enables reliable operation for each of the conveyor vehicles whilst requiring little height for installation. Furthermore, the amount of installation space needed can be minimized. The guide rails can be installed in a very compact arrangement which means that they can be fitted on a large number of rack stages. The contact line arrangements can be very compactly disposed inside the profiled cross-section of the guide rails.

A further embodiment is also of advantage because each of the conveyor vehicles within the same rack stage can be provided with the driving current and/or control current needed for driving purposes and/or for controlling the electronic control system by means of an independent power supply system.

Based on a further embodiment, it is possible to obtain a separate data transmission between a central control system and the individual conveyor vehicles by means of the contact line arrangement, for example by means of WLAN.

Based on another embodiment, the respective conveyor vehicle cannot only be supplied with power by the same contact line arrangement but also simultaneously with the corresponding data for controlling driving movements. Accordingly, the power and data supply for the first conveyor vehicle is run via the first contact line arrangement and the power and data supply for the second conveyor vehicle is run via the second contact line arrangement. Since the power and data supply of each conveyor vehicle is separate, a two-way data transmission can be run very reliably between the respective conveyor vehicle and the central control system by "modulating" the data signals onto the respective contact line arrangement.

Another embodiment is also of advantage because the guide rails can be manufactured with a very high bending strength on the one hand and with small profile dimensions on the other hand. As a result, the conveyor vehicles can be moved very exactly along the guide rails and the contact line arrangements can be very easily integrated inside the respective profiled cross-section of the guide rails. This being the case, the first contact line arrangement can be secured either to the bottom flange or to the web of the first guide rail. The second contact line arrangement can be secured either to the bottom flange or to the web of the second guide rail. In both cases, the contact line arrangements each sit inside the profiled cross-section of the first/second guide rail.

The advantage of other embodiments is that the respective contact line arrangements disposed on the tracks can be clearly assigned to each of the conveyor vehicles. This means that with very little in the way of mechanical requirements, faulty control of conveyor vehicles in the same rack stage can be prevented.

Based on another embodiment, the first article elevator device and first buffer device are disposed outside the rack aisle as a unit. The first buffer device comprises waiting devices exclusively in the direction of the rack aisle on one of the sides of the first article elevator device and in at least some of the rack stages for temporarily buffering one or more articles to be stored and/or retrieved. This results in a very compact design of the article handling unit whilst achieving sufficiently high storage and retrieval efficiency.

In another embodiment, the first buffer device comprises waiting devices in the direction of the rack aisle on both sides of the first article elevator device and in at least some of the rack stages for temporarily buffering one or more articles to be stored and/or retrieved. As a result, it is possible to operate with a split between waiting devices for storage mode and waiting devices for retrieval mode. This results in improved storage and retrieval efficiency.

As a result of another embodiment in which the article handling unit includes a first article elevator device, a second article elevator device, and waiting devices arranged on either the back or on the front side of each article elevator device, optimum utilization can be made of individual conveyor vehicles in the same rack stage, thereby achieving maximum storage and retrieval efficiency. It is also possible to move the articles to be stored and/or retrieved by means of the corresponding article elevator device, regardless of the respective position of the conveyor vehicles in the individual rack stages, either into the designated rack stage or out of a correspondingly pre-selected rack stage for a retrieval operation.

Based on a first embodiment in this respect, the second article elevator device and second buffer device are disposed outside the rack aisle as a unit. The second buffer device comprises waiting devices exclusively in the direction of the rack aisle on one of the sides of the second article elevator device and in at least some of the rack stages for temporarily buffering one or more articles to be stored and/or retrieved.

Based on a second embodiment, the second buffer device comprises waiting devices in the direction of the rack aisle on both sides of the second article elevator device and in at least some of the rack stages for temporarily buffering one or more articles to be stored and/or retrieved.

Since the first and/or second article elevator device of the article handling unit is/are disposed to the side of the rack aisle, the individual conveyor vehicles move past the first and/or second article elevator device. In one embodiment, a continuous rack aisle is obtained, making it possible to travel and/or move along the entire length of the rack aisle.

With another embodiment, the handling unit is disposed centrally inside the storage shelves. This means that travel paths between the two ends of the storage shelves for storing and retrieving articles can be made shorter.

In this respect, another option is an embodiment whereby no storage space inside the storage racks and/or storage shelves is taken up by the conveyor system transporting articles to and/or from the article elevator device and thus lost. This means that for the same space requirement, a greater number of articles can be stored in the storage shelves.

Also of advantage is the embodiment which allows depending on requirements, the conveyor vehicles to be transferred between the rack stages. The conveyor-elevator is capable of accommodating only a single conveyor vehicle or two conveyor vehicles on the platform which can be raised and lowered. Based on this latter embodiment, both conveyor vehicles can be transferred by the conveyor-elevator to a single rack stage or to different rack stages.

If the first conveyor vehicle and the second conveyor vehicle are moved on at least one of guide tracks, in a first operating phase the first conveyor vehicle can serve the retrieval waiting device for temporarily buffering one or more articles to be retrieved and the second conveyor vehicle can service the storage waiting device for temporarily buffering one or more articles to be stored. In a second operating phase, the first conveyor vehicle can serve the storage waiting device for temporarily buffering one or more articles to be stored and/or the second conveyor vehicle can serve the retrieval waiting device for buffering one or more articles to be retrieved. Switching between the operating phases for the conveyor vehicles is handled by means of the control system.

Based on another feature, it is also possible during the second operating phase for the first and second conveyor vehicles to serve either the retrieval waiting device for temporarily buffering one or more articles to be retrieved or the storage waiting device for temporarily buffering one or more articles to be stored.

The main advantage is that by providing separately disposed contact line arrangements, the conveyor vehicles respectively in the same rack stage can be activated even more flexibly without having to provide much more control equipment so that storage and retrieval operations can be optimized.

For example, if fast retrieval is required, articles can be retrieved not just by one conveyor vehicle but by both the conveyor vehicles in this rack stage. Accordingly, based on a first embodiment, articles can be taken out of the storage shelves on the left-hand side of the article elevator device only or on the right-hand side of the article elevator device only. Based on a second embodiment, however, articles can be taken out of the storage shelves from both the left-hand and right-hand side of the article elevator device.

In other words, simultaneously and independently of one another, the respective conveyor vehicles can pick up and put down articles at mutually separate locations, thereby further improving economic operation of the entire rack storage system.

If the first conveyor vehicle and the second conveyor vehicle are moved on at least one of the guide tracks, in a first operating phase the first conveyor vehicle can serve the retrieval waiting device for temporarily buffering one or more articles to be retrieved or the storage waiting device for temporarily buffering one or more articles 2 to be stored, and can convey the article to be stored either from the storage waiting device to one of the storage spaces acting as a buffer space or can convey the article to be retrieved from the buffer space to the retrieval waiting device, and, independently of the first conveyor vehicle, the second conveyor vehicle can convey the article to be retrieved and/or stored between the buffer space and a predefined storage space. In a second operating phase, the second conveyor vehicle can also serve the retrieval waiting device for temporarily buffering one or more articles to be retrieved or the storage waiting device for temporarily buffering one or more articles to be stored and can either convey the article to be stored from the storage waiting device to one of the storage spaces serving as a buffer space or to a predefined storage space, or can convey the article to be retrieved from the buffer space or predefined storage space to the retrieval waiting device. Switching between the operating phases for the conveyor vehicles is handled by means of the control system.

The advantage of this is that in the first operating phase, the first conveyor vehicle is used to pick up/transfer articles between the storage waiting device/retrieval waiting device and the conveyor vehicle, and the second conveyor vehicle is used to store/retrieve articles in/from the storage shelves. In the second operating phase, both conveyor vehicles are used for retrieval operations but also for storage operations in a preferred embodiment, which results in greater efficiency and/or enables peak-time operations such as primarily occur in retrieval mode to be covered.

Finally, another feature is of advantage when the waiting devices are used for both retrieval and storage. All that is necessary to achieve this is a simple reversal of the conveying direction for the articles. Accordingly, one and the same waiting device in retrieval mode corresponds to a retrieval waiting device and in storage mode to a storage waiting device.

For example, if an article which has been placed in readiness on the storage waiting device or moved by the article elevator device into one of the rack stages has to be stored in the storage rack, it is picked up from the waiting device or article elevator device by the first conveyor vehicle and temporarily stored in a free storage space (and/or buffer space) in the same rack stage. This article is then picked up from the now occupied storage space (and/or buffer space) by the second conveyor vehicle and is conveyed by the second conveyor vehicle to the storage space designated for it in this rack stage. Having arrived there, the article is set down in the storage space. Alternatively this article can also be stored in a different rack stage, in which case the second conveyor vehicle is moved with the article to the conveyor-elevator, transferred to the conveyor-elevator and then raised/lowered to the other rack stage. In this rack stage, the second conveyor vehicle is then transferred with the article onto the guide track and moved in this other rack stage to the designated storage space. This feature can be used primarily for slow-moving articles, known as B articles or C articles. Retrieval can take place in the opposite direction.

This enables storage and/or retrieval operations of articles to be more efficiently adapted to one another. It is also possible for articles that are not needed in between to be deposited in the buffer space in order to make space free on the article elevator device and/or waiting device for other articles, and these will then not be transferred until such time as the respective conveyor vehicle is not needed for another, more urgent order.

Another feature is of advantage because with this feature even after switching from the first operating phase to the second operating phase where the travel ranges of conveyor vehicles being operated simultaneously on one of the guide tracks intersect, a collision of the conveyor vehicles is prevented. This collision monitoring system may be operated on the basis of an additional "internal" sensor system on the conveyor vehicles or an "external" sensor system on each guide track. Alternatively and also independently of any sensor system, movements may be monitored exclusively by means of an electronic route planning module. However, a combination of options may be used as a means of monitoring movements.

To provide a clearer understanding, the invention will be described in more detail with reference to the appended drawings.

Figure 2:
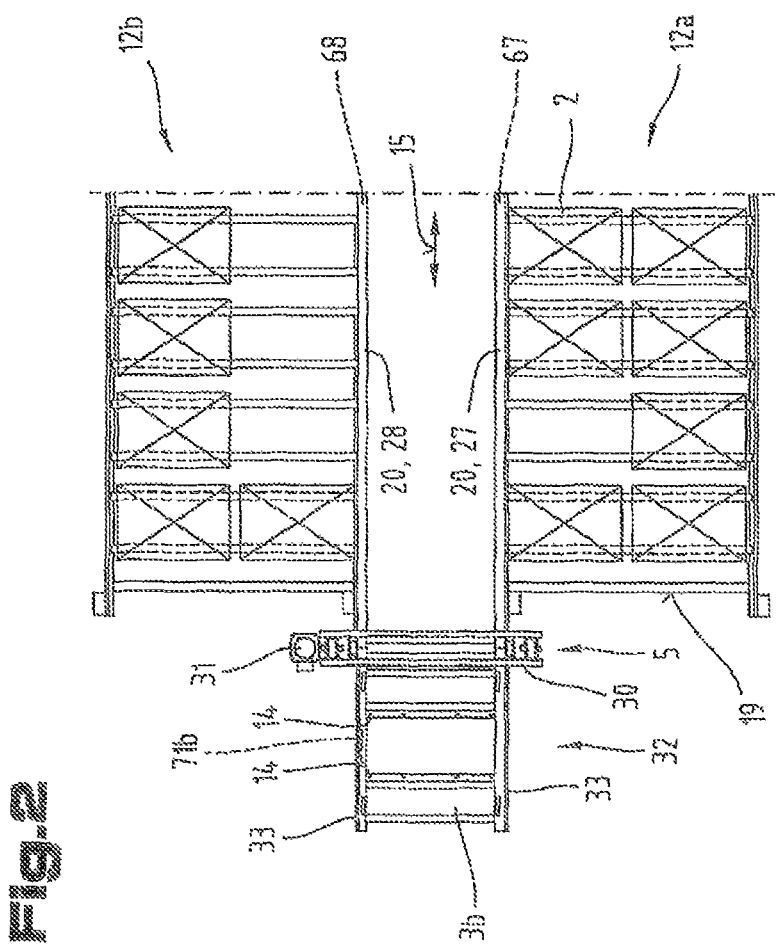
Figure 3:
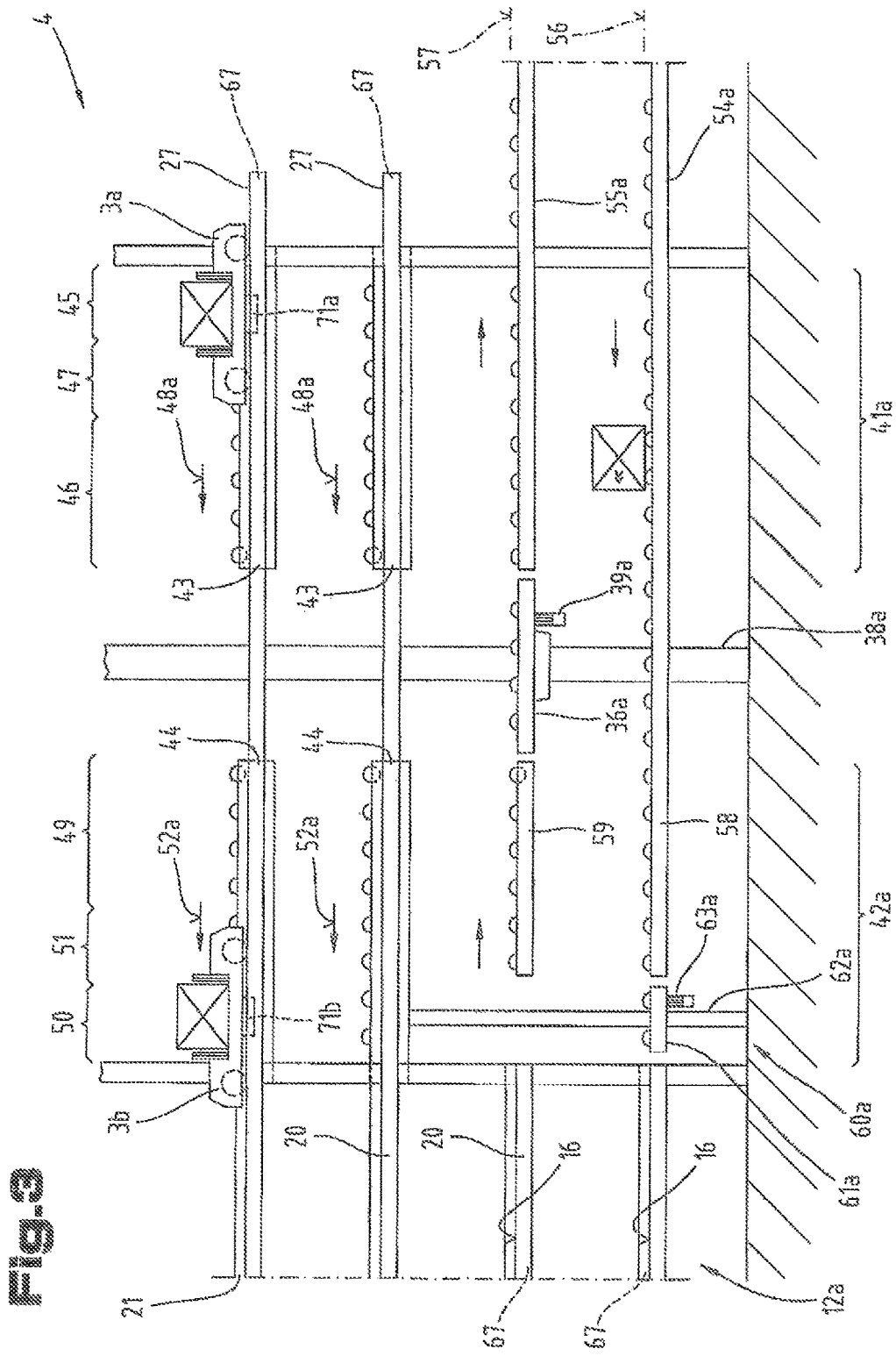
Figure 4:
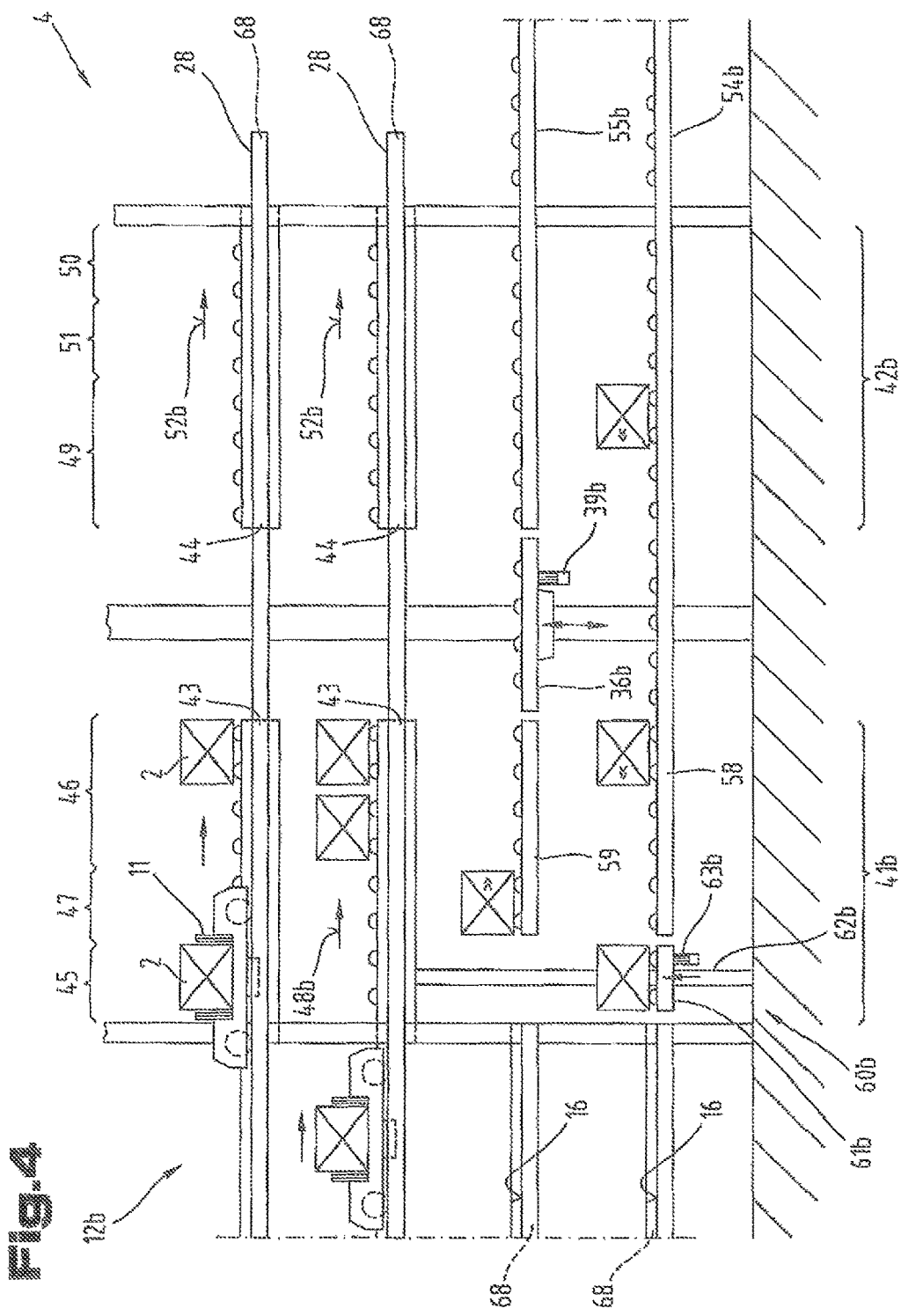
Figure 5:
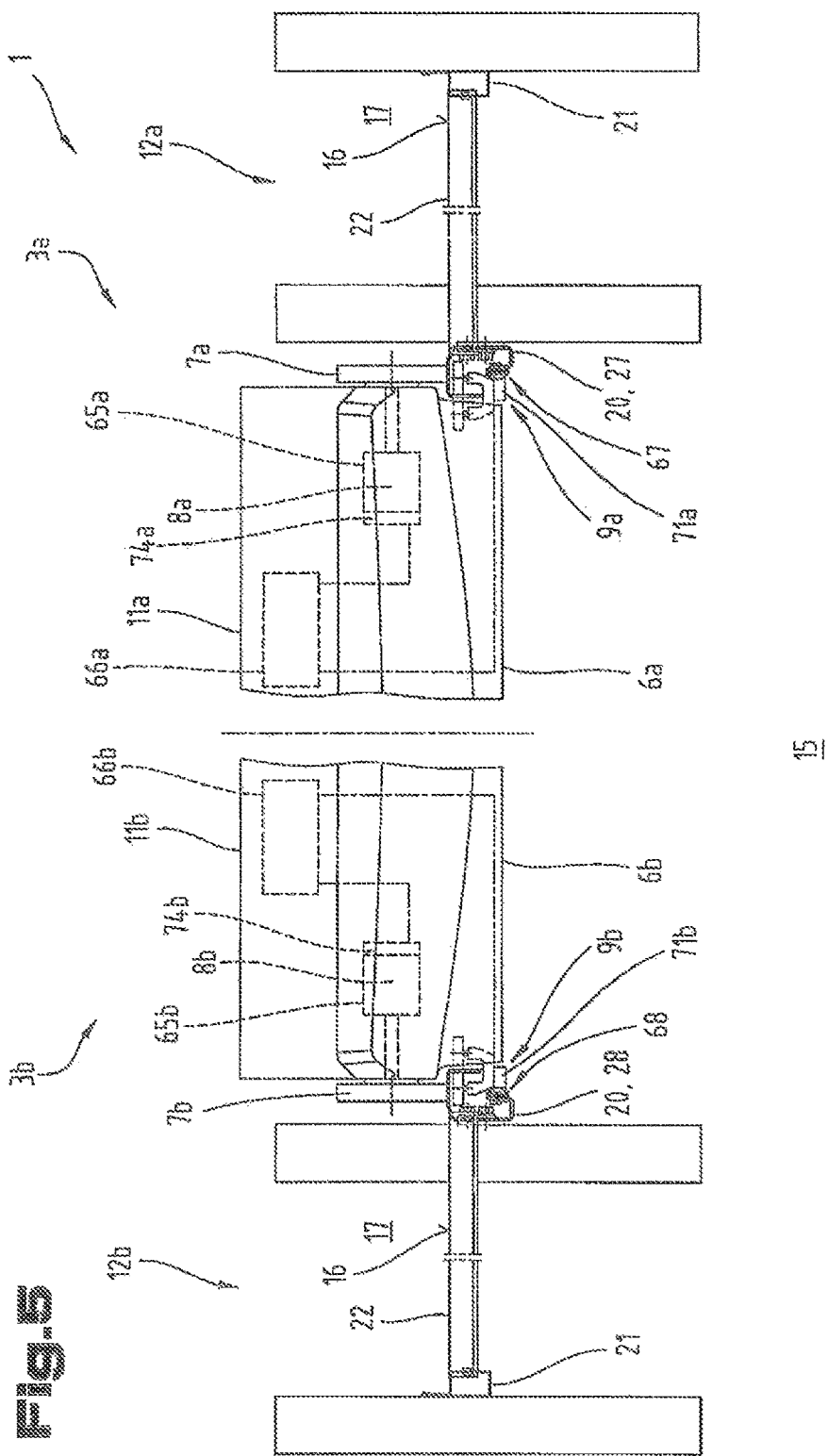
Figure 6:
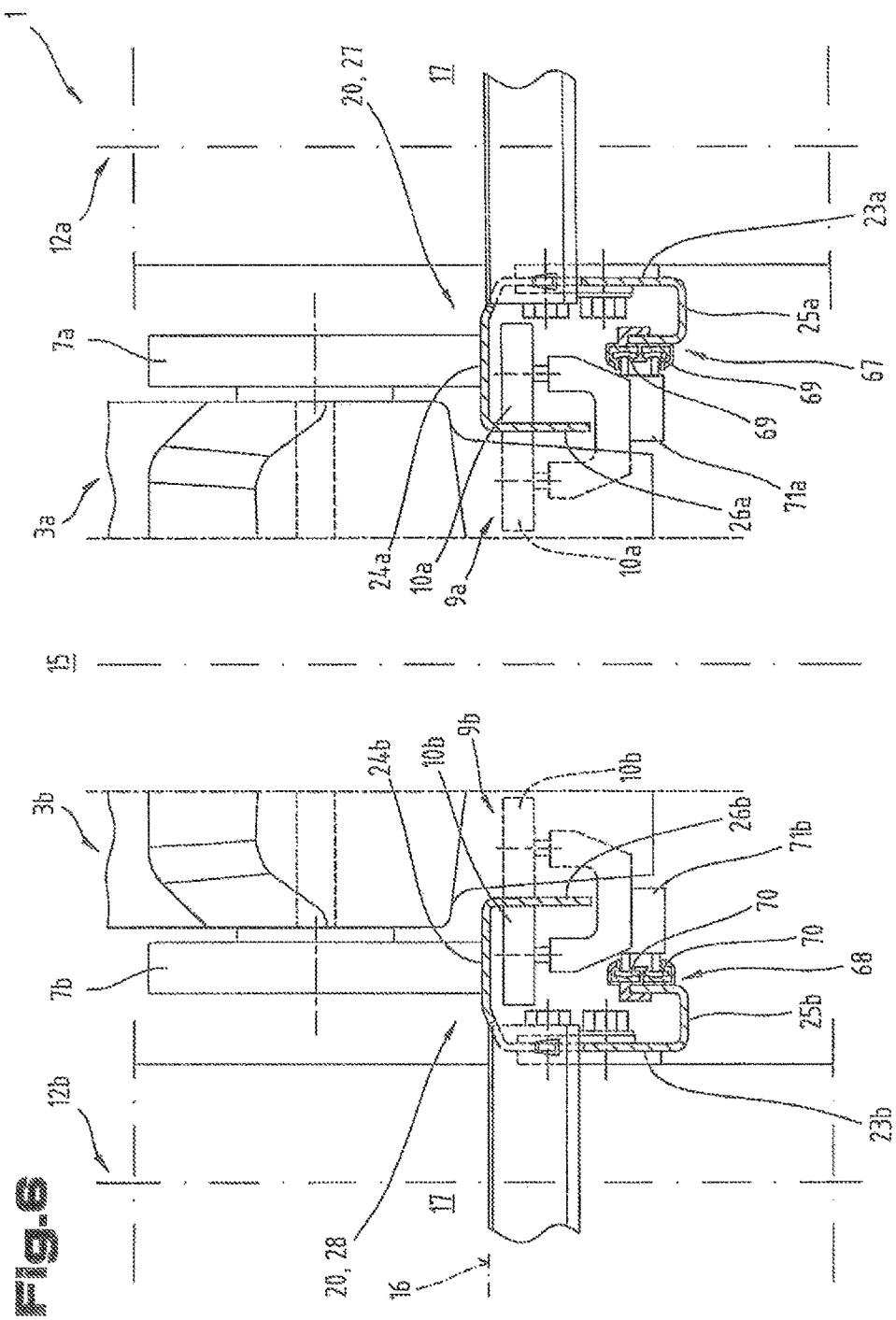
Figure 7:
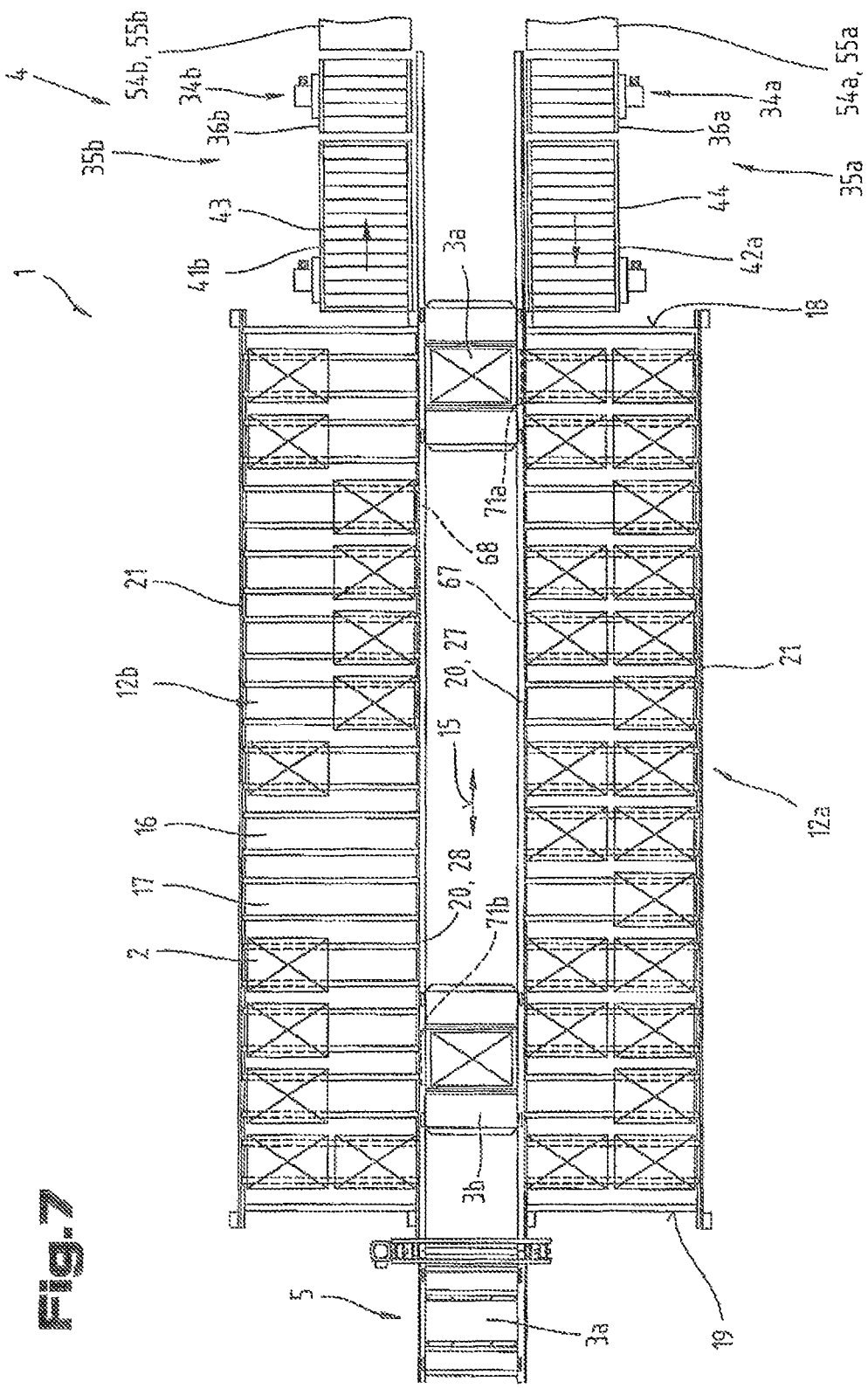

These are highly simplified, schematic diagrams illustrating the following:

FIG. 1 a plan view of a rack stage showing a detail of a first storage rack end of a rack storage system based on a first embodiment and second embodiment having a storage rack and an article handling unit;

FIG. 2 a plan view of a rack stage showing a detail of a second storage rack end of the rack storage system illustrated in FIG. 1;

FIG. 3 a side view of the article handling unit illustrated in FIG. 1 along line indicated in FIG. 1;

FIG. 4 a side view of the article handling unit illustrated in FIG. 1 along line IV-IV indicated in FIG. 1;

FIG. 5 a front view of the storage rack and sections of the two conveyor vehicles disposed one after the other;

FIG. 6 a diagram on a larger scale illustrating parts of FIG. 5;

FIG. 7 a plan view of a rack storage system based on a third embodiment with a storage rack and an article handling unit;

FIG. 8 a plan view of a rack storage system based on a fourth embodiment with a storage rack and an article handling unit;

FIG. 9 a plan view of a rack storage system based on a fifth embodiment with a storage rack and an article handling unit.

Firstly, it should be pointed out that the same parts described in the different embodiments are denoted by the same reference numbers and/or the same component names and the disclosures made throughout the description can be transposed in terms of meaning to same parts bearing the same reference numbers and/or the same component names. Furthermore, the positions chosen for the purposes of the description, such as top, bottom, side, etc., relate to the drawing specifically being described and can be transposed in terms of meaning to a new position when another position is being described.

FIGS. 1 to 4 illustrate a first embodiment of a rack storage system comprising a storage rack 1 for articles 2, several automotive, autonomous conveyor vehicles 3a, 3b, a preferably fully automated article handling unit 4 and optionally a conveyor-elevator 5.

The conveyor vehicle or vehicles 3a, 3b is or are preferably single-stage storage and retrieval units (shuttles) and, as will be explained below with reference to FIGS. 5 and 6, comprise at least a base frame 6, running wheels 7, a drive motor 8 for driving at least one running wheel 7, a guide device 9 with guide wheels 10 and a load handling device 11, for example for storing and/or retrieving articles 2 in and from a shelf 12a, 12b of the storage rack 1. In the embodiment illustrated, the load handling device 11 comprises extractable telescopic arms 13 on each of the two sides of the conveyor vehicle 3 and a driver 14—see FIG. 2—disposed on each of them for gripping one or more articles 2, in a manner known per se. The suffixes "a" and "b" of the individual components of the conveyor vehicles 3a, 3b may be used in the same way for the conveyor vehicle reference numbers to denote specific components in a more general description.

Such a load handling device 11 is known from US 2005/0095095 A1 or EP 0 647 575 A1, for example, and is of advantage due to the compact design of the telescopic arms 13 and its reliable operation. The articles 2 are containers, boxes, trays and such like or an actual stock item, for example.

The storage rack 1 has storage shelves 12a, 12b disposed parallel at a distance apart from one another with least one rack aisle 15 extending in between and storage spaces 17 for the articles 2 disposed next to one another in rack stages 16 disposed one above the other. At the ends, lying opposite one another, the storage rack 1 has a first storage rack side 18 and a second storage rack side 19. However, the storage rack 1 may also comprise a plurality of storage shelves 12a, 12b with a number of rack aisles 15 between adjacent storage shelves 12a, 12b.

Adjacent to the rack aisle 15, the storage shelves 12a, 12b respectively comprise vertical front posts and remote from the rack aisle 15 vertical rear posts, and extending between the front posts in the respective rack stage 16 at least one horizontal front beam 20 and between the rear posts in the respective rack stage 16 at least one horizontal rear beam 21. The beams 20, 21 are connected to the posts by fixing means, for example screws, push-fit connections. The front beams 20 extend in the longitudinal direction of the rack aisle 15 (X direction) and the beams 20 lying opposite one another in pairs in the respective rack stage 16 form a guide track along which the conveyor vehicle 3 can be moved.

The beams 20, 21 of the respective rack stage 16 are connected to one another by means of cross-members 22 forming the storage spaces 17 and/or storage surface. The cross-members 22 extend between the beams 20, 21 in the direction of the depth of a shelf compartment (Z direction).

In the embodiment illustrated, the storage shelves 12a, 12b form storage spaces 17 for the articles 2 in the rack stages 16 disposed next to one another and behind one another respectively so that two articles 2 can be deposited in the depth direction of the storage shelves 12a, 12b, thereby enabling so-called double depth storage. Alternatively, another option is for the storage shelves 12a, 12b in the rack stages 16 to have only one row of adjacently disposed storage spaces 17 for the articles 2, in which case only one article 2 can be deposited in the depth direction of the storage shelves 12a, 12b, thus forming a so-called single-depth storage system. However, a multi-depth storage system for the articles 2 is also possible, in which case it will be based on the size and/or dimensions of the articles 2.

The front beam 20, illustrated in FIG. 6, comprises a web 23, a horizontal top flange 24 disposed at an angle to it, a bottom flange 25 disposed at an angle to the web 23 and a guide web 26 at an angle to the top flange 24. The top flange 24 forms a horizontal running surface for the running wheels 7 of the conveyor vehicle 3a, 3b and the guide web 26 forms mutually opposite guide surfaces for the guide wheels 10 of the guide device 9. The bottom flange 25 forms a horizontal profiled arm and optionally has a vertical profiled arm at an angle to it.

The oppositely lying pairs of front beams 20 in the respective rack stage 16 together form a guide track and in the embodiment illustrated as an example here will be referred to as first and second guide rails 27 and 28. A more detailed description of how the individual conveyor vehicles 3a, 3b are supplied with power and/or data will follow later.

In spite of the fact that there are multiple conveyor vehicles 3a, 3b in at least individual ones of the rack stages 16, it may nevertheless be necessary to bring another conveyor vehicle 3b from another rack stage 16 into a rack stage 16 in which only a single conveyor vehicle 3a is provided, for example. The known conveyor-elevator 5 illustrated in FIG. 2 may be used for this purpose.

Since, these days, it is necessary to make the storage and retrieval of articles 2 more efficient and keep the size of the rack storage system as small as possible, it is preferable to use two conveyor vehicles 3a and 3b simultaneously at least in some of the rack stages 16. In principle, however, it would also be possible to use more than two conveyor vehicles 3a, 3b, e.g. three or more conveyor vehicles 3a, 3b, in each rack stage 16.

The conveyor vehicles 3 represent a considerable cost factor of rack storage systems but are more frequently needed in greater numbers in order to turn around goods more quickly and efficiently (storage and retrieval of articles 2). For this reason, at least two conveyor vehicles 3a and 3b are provided in at least individual ones of the rack stages 16 simultaneously in order to convey and/or move articles 2 around within the respective rack stage 16. A more detailed description of this will be given with reference to the next drawings.

In the example illustrated, the conveyor-elevator 5 (transfer device) is disposed on the second storage rack side 19, at the end, in front of the storage rack 1 and comprises a guide frame 30 and handling device 32 for a conveyor vehicle or vehicles 3a, 3b which can be raised and lowered on the guide frame 30 by means of a lift drive 31. The handling device 32 comprises horizontally extending beams 33 parallel with the rack aisle 15 (X direction) spaced at a distance apart and, like the guide rails 27, 28, each provided with a contact line arrangement (not illustrated) in order to supply the (right-hand or left-hand) conveyor vehicle 3a; 3b with power and/or data when it has to be transferred between the rack stages 16. These contact line arrangements are identical to the contact line arrangements 67, 68 used for the guide rails 27, 28. If the handling device 32 is dimensioned accordingly, it is also possible for two conveyor vehicles 3a, 3b to be accommodated one after the other on the beams 33 simultaneously and supplied independently of one another with power and/or data. Due to the lifting movement, the handling device 32 can be moved relative to the rack stages 16 in the vertical direction (Y direction) to a y position set by a computer system.

The article handling unit 4 comprises, disposed at the end in front of the storage shelves 12a, 12b, a first article elevator device 34a and a first buffer device 35a for buffering articles 2. This represents the first possible embodiment of the article handling unit 4 of the storage rack 1.

Based on a second embodiment, however, it is preferable if a second article elevator device 34b and a second buffer device 35b for buffering articles 2 are provided, as indicated by broken lines in FIG. 1. Such an embodiment is suitable for meeting the highest efficiency requirements and may be construed as a second independent embodiment of the article handling unit 4. It should be pointed out that the following description relates to article elevator devices 34a, 34b as well as the buffer devices 35a, 35b disposed on both sides of the rack aisle 15 although it is also possible to provide only one of the article elevator devices 34a or 34b and one of the buffer devices 35a or 35b on only one of the sides of the rack aisle 15.

In the embodiment illustrated, the article elevator devices 34a, 34b are disposed opposite one another in mirror image with respect to the rack aisle 15. Alternatively, it is also possible for the article elevator devices 34a, 34b to be disposed opposite one another but axially offset from one another in the direction of the rack aisle 15.

The stationary article elevator devices 34a, 34b respectively comprise a conveyor device 36a, 36b for articles 2 which can be raised and lowered, and the first conveyor device 36a is installed on an elevator frame which can be moved vertically by means of a first lift drive 37a and the second conveyor device 36b is installed on an elevator frame which can be moved vertically by means of a second lift drive 37b. In the embodiment illustrated, the first conveyor device 36a is mounted above the elevator frame on a first mast 38a and the second conveyor device 36b is mounted above the elevator frame on a second mast 38b. The raisable and lowerable conveyor devices 36a, 36b and/or their conveyors can be controlled independently of one another.

The conveyor devices 36a, 36b may each comprise a conveyor which can be reversibly driven by means of a drive motor 39a, 39b (FIG. 3; 4) with a reversible conveying direction 40a, 40b extending parallel with the rack aisle 15 (FIG. 1) and are capable of accommodating one article 2 or at least two articles 2 disposed one after the other in the conveying direction 40a, 40b. When the conveyor device 36a, 36b is positioned between mutually opposite waiting devices 43, 44, as illustrated in FIG. 1, the conveying direction 40a, 40b corresponds to the conveyors of the respective waiting devices 43, 44 if the latter is equipped with a separate conveyor device. In this case, this might be called an accumulation conveyor device.

When, on the other hand, the conveyor device 36a, 36b is positioned between mutually opposite conveyor devices 54a, 55a, 54b, 55b, as illustrated in FIGS. 3; 4, the conveying direction 40a, 40b corresponds to the conveyors of the conveyor devices 54a, 55a, 54b, 55b. The conveyor is a roller track, conveyor belt or such like, for example.

Instead of the accumulation conveyors, the waiting devices 43, 44 may alternatively be provided in the form of stationary platforms without a conveyor. The different variants of the waiting devices are disclosed in WO 2013/090970 A2 which constitutes part of the subject matter of this disclosure.

Based on this second embodiment, the fixedly installed buffer devices 35a, 35b each comprise a first buffer line section 41a, 41b and a second buffer line section 42a, 42b, and waiting devices 43, 44 are disposed one above the other in each of these buffer line sections 41a, 41b, 42a, 42b at least in some of the rack stages 16.

As may be seen from FIGS. 3 and 4, no waiting devices 43, 44 are provided in the bottom two rack stages 16 of the first buffer line section 41a and second buffer line section 42b on the one hand and in the bottom rack stage 16 of the first buffer line section 41b and second buffer line section 42a on the other hand, to enable a conveyor system to be provided for transporting articles 2 to the article elevator device 34a, 34b and for transporting articles 2 away from the article elevator device 34a, 34b.

The waiting devices 43 in the first buffer line section 41a, 41b may each be provided in the form of accumulation tracks comprising a pick-up section 45, a transfer section 46 and between them at least one buffer section 47. In this embodiment, the transfer section 46 comprises two transfer places on which two articles 2 can be deposited. The pick-up section 45 of this embodiment, on the other hand, comprises a pick-up place from which an article 2 can be picked up. The buffer section 51 comprises at least one buffer space for an article 2. The articles 2 can be conveyed from the pick-up section 45 remote from the article elevator device 34a, 34b to the transfer section 46 adjacent to the article elevator device 34a, 34b in a single conveying direction 48a, 48b by means of the accumulation tracks.

The waiting devices 44 in the second buffer line section 42a, 42b may also each be provided in the form of accumulation tracks comprising a pick-up section 49, a transfer section 50 and between them at least one buffer section 51. The pick-up section 49 in this embodiment comprises two pick-up places from which two articles 2 can be picked up. The transfer section 50 of this embodiment, on the other hand, comprises a transfer place on which an article 2 can be deposited. The buffer section 51 comprises at least one buffer space for an article 2. The articles 2 can be conveyed from the pick-up section 49 adjacent to the article elevator device 34a, 34b to the transfer section 50 remote from the article elevator device 34a, 34b in a single conveying direction 52a, 52b by means of the accumulation tracks.

Accordingly, the waiting devices 43 in the first buffer line sections 41a, 41b are used for operations involving the retrieval of articles 2 and/or act as retrieval waiting devices and the waiting devices 44 in the second buffer line sections 42a, 42b are used for operations involving the storage of articles 2 and/or act as storage waiting devices.

The waiting devices 43, 44 and/or accumulation tracks may be provided in the form of accumulating roller conveyors, accumulating belt conveyors and such like, and one accumulation place respectively constitutes one of the pick-up places for the pick-up sections 49, one accumulation place constitutes the pick-up place for the pick-up sections 45, one accumulation place respectively constitutes one of the transfer places for the transfer sections 46, one accumulation place constitutes the transfer place for the transfer sections 50, and one accumulation place constitutes at least one buffer space and/or buffer section 47, 51. Accordingly, at least four articles 2, preferably five articles 2, can be buffered on a waiting device 43, 44.

As may be seen from FIGS. 1 and 3, the waiting devices 43, 44, if they are provided with a separate conveyor, have a single (non-reversible) conveying direction 48a, 48b, 52a, 52b in the respective rack stages 16. In other words, the waiting devices 43, 44 of every buffer device 35a, 35b and/or the accumulation tracks in all the rack stages 16 in which they are disposed are operated in a single (non-reversible) conveying direction 48a, 48b, 52a, 52b. The waiting devices 43, 44 of every buffer device 35a, 35b and/or the accumulation tracks in every common rack stage 16 in which they are disposed are preferably operated in a single (non-reversible) conveying direction 48a, 48b, 52a, 52b and hence along the buffer device 35a from right to left, as illustrated in FIGS. 1 and 3 and along the buffer device 35b, from left to right, as may be seen from FIGS. 1 and 4. Only the conveying direction 40a, 40b of the conveyor device 36a, 36b is reversible, as described above. However, the (non-reversible) conveying direction 48a, 52a is the opposite of the (non-reversible) conveying direction 48b, 52b.

Again in this embodiment as may be seen from FIGS. 1 and 3, horizontal beams 20 extend along the article handling unit 4 in the longitudinal direction of the rack aisle 15 (X direction) and in at least some of the rack stages 16, as described above. The conveyor vehicles 3a, 3b can transport articles 2 to be retrieved from the storage spaces 17 to the pick-up section 45 of the first buffer line sections 41a, 41b or can transport articles 2 to be stored from the transfer section 50 of the second buffer line sections 42a, 42b to the storage spaces 17.

The beams 20 and/or guide tracks extend in the longitudinal direction of the rack aisle 15 (X direction) along the storage shelves 12a, 12b and along the article elevator devices 34a, 34b and buffer devices 35a, 35b. A switching region 53 is therefore defined along the article elevator devices 34a, 34b and buffer devices 35a, 35b.

Linking up with the article handling unit 4 is a pre-zone conveyor system for transporting articles 2 to the article elevator device 34a and optionally to the article elevator device 34b and for transporting articles 2 away from the article elevator device 34a and optionally from the article elevator device 34b. It comprises a first conveyor device 54a for transporting articles 2 to the article elevator device 34a and a second conveyor device 55a for transporting articles 2 away from the article elevator device 34a.

If the article elevator device 34b and buffer device 35b illustrated in FIGS. 1 and 3 are provided, the conveyor system in turn comprises a first conveyor device 54b for transporting articles 2 to the article elevator device 34b and a second conveyor device 55b for transporting articles 2 away from the article elevator device 34b.

In the embodiment illustrated, the first conveyor devices 54a; 54b and second conveyor devices 55a; 55b are disposed on conveyor levels 56, 57 lying one above the other in the bottom height region (floor region) of the storage rack 1 and have opposite conveying directions, as indicated by the arrows. Alternatively, the first conveyor devices 54a; 54b and second conveyor devices 55a; 55b may also be disposed on conveyor levels 56, 57 one above the other in the top height region of the storage rack 1. The first conveyor devices 54a; 54b and second conveyor devices 55a; 55b thus extend parallel with the rack aisle 15 in the extension of the respective shelf 12a; 12b.

Conveyor level 56 and the lowermost rack stage 16 preferably extend within a first horizontal plane and conveyor level 57 and the rack stage 16 lying above it extend in a second horizontal plane. This makes for a very space-saving layout of the conveyor system.

As may be seen in FIGS. 1, 3 and 4, the first conveyor device 54a; 54b comprises (stationary) conveyor sections 58, 59 extending in conveyor levels 56, 57 lying one above the other and parallel with the rack aisle 15, which are connected to one another by means of transfer lifts 60a; 60b.

If the article elevator device 34b and buffer device 35b are also provided, as illustrated in FIGS. 1, 3 and 4, the first conveyor device 54b also comprises a transfer lift 60b for articles 2.

The fixedly installed transfer lift 60a; 60b comprises a raisable and lowerable conveyor device 61a, 61b for articles 2 and the first conveyor device 61a is mounted on an elevator frame which can be moved vertically by means of a first lift drive (not illustrated) and a second conveyor device 61b is mounted on an elevator frame which can be moved vertically by means of a second lift drive (not illustrated). In the embodiment illustrated, the first conveyor device 61a is mounted above the elevator frame on a first mast 62a and the second conveyor device 61b is mounted above the elevator frame on a second mast 62b.

The conveyor devices 61a, 61b respectively comprise a conveyor which can be driven by a drive motor 63a, 63b in a conveying direction extending parallel with the rack aisle 15 and are capable of accommodating a single article 2 or two articles 2 disposed one after the other in the conveying direction. The conveyor device is a roller track or belt conveyor or such like, for example.

The conveyor devices 61a, 61b can be moved by means of the lift drive between the conveyor sections 58, 59 in order to pick up articles 2 from the bottom conveyor section 58 and deposit them on the top conveyor section 59.

The conveyor devices 36a; 36b can be moved independently of one another (uncoupled) between the rack stages 16 to the height level of each and every rack stage 16 and to the height level of conveyor level 57 so that articles 2 can be conveyed between the conveyor device 36a; 36b and waiting device 43, 44 on the one hand and between the conveyor device 36a; 36b and waiting device 43, 44 and conveyor devices 54a, 55a, 54b, 55b on the other hand.

Based on a third embodiment schematically illustrated in FIG. 7, it may be that only the waiting devices 43, 44 and the two article elevator devices 34a, 34b directly adjacent to the first storage rack side 18 are provided. The conveyor system and/or the pre-zone conveyor system will then be as described above but disposed on only one side of the storage shelves 12a or 12b. This being the case, the waiting devices 43 disposed in at least some of the rack stages 16 will be used in the first buffer line sections 41b for retrieving articles 2 and/or act as retrieval waiting devices and the waiting devices 44 disposed in at least some of the rack stages 16 will be used in the second buffer line sections 42a for storing articles 2 and/or act as storage waiting devices.

In a fourth embodiment schematically illustrated in FIG. 8, a single buffer device 35a and a single article elevator device 34a are provided on the first storage rack side 18 directly adjacent to one of the storage shelves 12a or 12b. In the direction of the rack aisle 15 on a single side of the article elevator device 34a, the buffer device 35a comprises a buffer line section 42a with waiting devices 72 for buffering one or more articles 2 to be stored and/or retrieved disposed in at least some of the rack stages 16. It should be pointed out that, by contrast with the previously described embodiments, the waiting devices 72 used here in every rack stage 16 may also be driven in reverse. If the waiting devices 72 also comprise conveyors, the latter can also reverse the conveyor devices as indicated by the double arrow. This enables both storage operations and retrieval operations of articles 2 to be carried out in the respective rack stages 16. The reason for this is that the waiting devices 72 are provided on only one side of the article elevator device 34a or 34b. If the waiting devices 72 are provided so that they are able to transport articles 2 lengthways in the direction of the rack aisle 15, they may also be termed accumulation conveyor devices with a reversible drive.

To avoid unnecessary repetition, a more detailed description of the third and fourth embodiments based on the previously described first and second embodiments illustrated in FIGS. 1 to 3 will not be given because only system parts of the same type are used.

The first and second guide rails 27, 28 of the respective guide track extend as far as the article handling unit 4 or the first and second guide rails 27, 28 run past the article handling unit 4.

FIG. 9 illustrates a fifth embodiment of the rack storage system 1 which may optionally be construed as an independent embodiment in its own right, the same reference numbers and/or component names being used to denote parts that are the same as those described in connection with FIGS. 1 to 8 above. To avoid unnecessary repetition, reference may be made to the more detailed description of FIGS. 1 to 8 given above.

In the fifth embodiment illustrated as an example here, the first and second article elevator devices 34a, 34b of the article handling unit 4 are again provided on both sides of the rack aisle 15. They may be installed apart from one another by at least an aisle width and lie opposite one another in mirror image. Furthermore, by contrast with the examples of embodiments described above, the article handling unit 4 is integrated in the storage shelves 12a, 12b. This means that the article handling unit 4 is not disposed against one of the storage rack sides 18, 19 but between the first and second storage rack sides 18, 19 inside at least one of the storage shelves 12a, 12b. This embodiment may also be described as an integrated storage variant. The two article elevator devices 34a, 34b with their masts 38a, 38b and their conveyor devices 36a, 36b may be the same as those described in more detail above in connection with FIGS. 1 to 4. As a result, a continuous rack aisle 15 is also obtained in the region of the article elevator devices 34a, 34b.

The buffer devices 35a, 35b in this instance also comprise the waiting devices 43, 44 disposed respectively on either side of the article elevator devices 34a, 34b as viewed in the direction of the rack aisle 15.

Looking at those parts of the system which make up the article handling unit 4 in the region of the first shelf 12a, the waiting devices 43 with their buffer line sections 41a disposed on the right-hand side of the first article elevator device 34a are used respectively for retrieval operations of one or more articles 2 in the individual rack stages 16 and the waiting devices therefore operate as so-called retrieval waiting devices.

The waiting devices 44 with their other buffer line sections 42a on the left-hand side of the first article elevator device 34a are used respectively for storage operations of one or more articles 2 in the individual rack stages 16 and the waiting devices operate as so-called storage waiting devices.

On the side of the rack aisle 15 lying opposite the first article elevator device 34a is the second article elevator device 34b with its conveyor device 36b on its mast 38b and the conveyor device 36b can be moved in the vertical direction between the rack stages 16.

The buffer device 35b in turn comprises the waiting devices 43, 44 on either side of the second article elevator device 34b as viewed in the direction of the rack aisle 15, which are disposed in at least some of the rack stages 16.

The waiting devices 43 with their buffer line sections 41b to the left-hand side of the second article elevator device 34b are used for retrieving one or more articles 2.

The waiting devices 44 disposed on the right-hand side of the second article elevator device 34b are used for storing one or more articles 2.

The first article elevator device 34a is in turn connected to a conveyor system for transporting articles 2 to and/or away from the first article elevator device 34a, as schematically indicated. The conveyor system comprises a conveyor device 54a on which articles 2 to be stored are transported and a conveyor device 55a on which articles 2 are transported for a retrieval operation. The conveyor devices 54a, 55a preferably extend in a plane parallel with the rack aisle and are disposed below the lowermost rack stage 16 of the storage shelves 12a. The conveyor devices 54a, 55a therefore adjoin the article elevator device 34a so that articles 2 can be conveyed between the conveyor devices 54a, 55a and the conveyor device 36a lowered to the plane.

The second article elevator device 34b is in turn connected to a conveyor system for transporting articles 2 to and/or from the second article elevator device 34b, as schematically indicated. The conveyor system comprises a conveyor device 54b on which articles 2 to be stored are transported and a conveyor device 55b on which articles 2 are transported for a retrieval operation. The conveyor devices 54b, 55b preferably extend in a plane parallel with the rack aisle and are disposed below the lowermost rack stage 16 of the storage shelves 12*b*. The conveyor devices 54*b*, 55*b* therefore adjoin the article elevator device 34*b* so that articles 2 can be conveyed between the conveyor devices 54*b*, 55*b* and the conveyor device 36*b* lowered to the plane.

Again in this embodiment, there are several, preferably two, conveyor vehicles 3*a*, 3*b* in at least individual ones of the rack stages 16 which can be moved within the rack aisle 15 in each rack stage 16. Individual ones of the conveyor vehicles 3*a*, 3*b* can additionally be transferred from one rack stage 16 to another rack stage 16 spaced at a distance apart from it in the vertical direction by means of the vehicle-elevator device 5 disposed in the region of the second storage rack side 19 in a known manner.

In another embodiment, unlike the article handling unit 4 illustrated in FIG. 9, another option is to provide one of the article elevator devices 34*a* or 34*b*, one of the buffer devices 35*a* or 35*b* and conveyor devices 54*a*, 55*a* or 54*b*, 55*b* on one side of the rack aisle 15 only.

Independently of the above, however, in another embodiment, the buffer device 35*a*, 35*b* could comprise waiting devices 43 or 44 on only one side.

As is clear from the description given above, the article handling device 4 comprises the first article elevator device 34*a* and the first buffer device 35*a* and/or the second article elevator device 34*b* and the second buffer device 35*b*.

Firstly, the buffer device 35*a*; 35*b* may have waiting devices 43; 44 in the direction of the rack aisle 15 on only one of the sides of the article elevator device 34*a*; 34*b* and in at least some of the rack stages 16 or all of the rack stages 16 for buffering one or more articles 2 to be stored and/or retrieved. Alternatively, the buffer device 35*a*; 35*b* may have, in the direction of the rack aisle 15 on one side of the article elevator device 34*a*; 34*b* and in at least some of the rack stages 16 or all of the rack stages 16, a first waiting devices 43 for buffering one or more articles 2 to be stored and/or retrieved and, in the direction of the rack aisle 15 on the other side of the first article elevator device 34*a*; 34*b* and in at least some of the rack stages 16 or all of the rack stages 16, a second waiting devices 44 for buffering one or more articles 2 to be stored and/or retrieved.

Alternatively, the article handling device 4 may comprise the first article elevator device 34*a* and the first buffer device 35*a* as well as the second article elevator device 34*b* and the second buffer device 35*b*, in which case the buffer devices 35*a*, 35*b* have waiting devices 72 for buffering one or more articles 2 to be stored and/or retrieved exclusively in the direction of the rack aisle 15 on only one of the sides of the article elevator device 34*a*, 34*b* and in at least some of the rack stages 16 or all of the rack stages 16.

These embodiments enable a so-called "indirect transfer" of articles 2 between the article elevator device 34*a*; 34*b*; 72 and a conveyor vehicle 3*a*, 3*b*, where the articles 2 are temporarily accommodated by the buffer devices 35*a*; 35*b* during a storage and/or retrieval operation.

In principle, however, it would also be conceivable for the article handling device 4 to have exclusively at least one article elevator device and to dispense with the buffer device.

This embodiment enables a so-called "direct transfer" of articles 2 between the article elevator device 34*a*; 34*b* and a conveyor vehicle 3*a*, 3*b* so that the storage operation and/or retrieval operation takes place without temporarily storing the articles 2 in a buffer device.

The essential thing is that with all of these embodiments, both during an "indirect transfer" of articles 2 and a "direct transfer" of articles 2, the article elevator devices 34*a*; 34*b* and optionally the buffer devices 35*a*; 35*b*; 72 are disposed outside the rack aisle 15 and/or aisle clearance. The article elevator device 34*a*; 34*b* and the buffer device 35*a*; 35*b*; 72 thus form a unit. As a result of this arrangement, the conveyor vehicles 3*a*, 3*b* on the tracks 27, 28 are able to move past the article elevator devices 34*a*; 34*b*; 72 and buffer devices 35*a*; 35*b*; 72.

As may be seen more clearly from FIG. 5 in conjunction with FIG. 6, each of the conveyor vehicles 3*a*, 3*b* has a separate drive motor 65*a*, 65*b* as well as a separate electronic control unit 66*a*, 66*b*. The conveyor vehicles 3*a*, 3*b* can therefore be controlled by means of an electronic control system (not illustrated) independently of one another in order to store and/or retrieve articles 2 simultaneously in or from a rack stage 16. The control system ensures that several conveyor vehicles can be moved without colliding.

FIG. 6 illustrates one of the guide tracks with the first guide rail 27 as well as the second guide rail 28 in one of the rack stages 16, the first guide rail 27 with the first conveyor vehicle 3 which can be moved on it being shown on the right-hand side of this diagram and the second guide rail 28 with the second and/or other conveyor vehicle 3*b* being shown on the left-hand side of the rack aisle 15. The two conveyor vehicles 3*a*, 3*b* are usually disposed one after the other and are each supplied with power and/or data by means of a supply system disposed in the first and second guide rails 27, 28.

To this end, the first guide rail 27 is equipped with a first contact line arrangement 67 and the second guide rail 28 is equipped with a second contact line arrangement 68. Each contact line arrangement 67, 68 further comprises separate contact lines 69, 70. The contact line arrangements 67, 68 respectively extend across the entire length of the guide rails 27, 28.

The first conveyor vehicle 3*a* in turn comprises a current collector 71*a* by which it contacts the contact lines 69 of the first contact line arrangement 67 for a supply of power and/or data.

The second conveyor vehicle 3*b* in turn likewise comprises a separate current collector 71*b* by which it contacts the contact lines 70 of the second contact line arrangement 68 for its power and/or data supply.

Accordingly, the first conveyor vehicle 3*a* and the second conveyor vehicle 3*b* can be supplied simultaneously and independently of one another along at least one of the guide tracks on the first and second guide rails 27, 28 thereof not only with power but also with data, therefore also enabling them to be moved independently of one another. Due to the spatially separate layout of the contact line arrangements 67, 68 on the first and second guide rails 27, 28, power and/or data can be supplied to exactly the predefined conveyor vehicles 3*a*, 3*b* via each of the contact lines 69, 70 independently of one another.

It is also of advantage if each of the contact line arrangements 67, 68 respectively have at most two contact lines 69, 70 run separately from one another. The contact line arrangements 67, 68 can therefore be installed respectively in the first and/or second guide rails 27, 28, requiring little space.

It is also possible for the first and second conveyor vehicles 3*a*, 3*b* and load handling device 11 to each be supplied with power exclusively by means of the contact line arrangements 67, 68 contacted by the conveyor vehicles 3*a*, 3*b*. The data supply for controlling the drive of the individual conveyor vehicles 3*a*, 3*b* and for actuating the load handling device 11, on the other hand, may be provided by means of a wireless close-range communication link. This might be a radio link, for example WLAN, Bluetooth or ZigBee.

The electronic control unit 66a of the first conveyor vehicle 3a and the electronic control unit 66b of the second conveyor vehicle 3b are therefore connected via a wireless, in particular common, communication network, in particular a radio network, to the central control system to enable a two-way data transmission.

Accordingly, the first contact line arrangement 67 with its contact lines 69 exclusively forms a first power supply bus and the second contact line arrangement 68 with its contact lines 70 exclusively forms a second power supply bus. Motor and/or control currents for the drive motor 65a and/or electronic control unit 66a of the first conveyor vehicle 3a can be transmitted via the first power supply bus and motor and/or control currents for the drive motor 65b and/or electronic control unit 66b of the second conveyor vehicle 3b can be transmitted via the second power supply bus. Similarly, motor and/or control currents for actuating the load handling device 11a of the first conveyor vehicle 3a can be transmitted via the first power supply bus and motor and/or control currents for actuating the load handling device 11b of the second conveyor vehicle 3b can be transmitted via the second power supply bus.

To this end, the drive motor 65a and/or actuator of the load handling device 11a are connected to the electronic control unit 66a of the first conveyor vehicle 3a and/or the drive motor 65b and actuator of the load handling device 11b are connected to the electronic control unit 66b of the second conveyor vehicle 3b.

However, it is preferable if both the power and the data of the first and second conveyor vehicles 3a, 3b (and hence of the drive motors 65a, 65b and/or actuator of the load handling devices 11a, 11b) are supplied exclusively in each case via the contact line arrangements 67, 68 contacted by the conveyor vehicles 3a, 3b independently of one another.

Accordingly, data for the first conveyor vehicle 3a is "modulated to" the same contact lines 69 of the contact line arrangement 67 and/or data for the second conveyor vehicle 3b is "modulated to" the same contact lines 70 of the contact line arrangement 68. To this end, the control system is provided with a device (not illustrated) for specifically modulating the data onto the current supplying the first conveyor vehicle 3a and/or second conveyor vehicle 3b on the corresponding guide track and the electronic control units 66a, 66b on every conveyor vehicle 3a, 3b are provided with a device (not illustrated) for demodulating the data from the current.

This means, for example, that by using different frequencies for the power and data, the latter can be picked up separately from one another in each case by means of a filter on the respective conveyor vehicle 3a or 3b. Since each of the conveyor vehicles 3a, 3b is supplied respectively with power and data via only a single contact line arrangement 67 and/or 68, the individual conveyor vehicles 3a, 3b can be reliably controlled in all of the rack stages 16 provided and equipped for them independently of one another. This not only enables an improved power supply to be set up but also enables fault-free data transmission from the central control system to each and every individual conveyor vehicle 3a, 3b in the respective rack stages 16.

For details of possible embodiments of the data transmission between the control system and one of the conveyor vehicles 3a, 3b, reference may be made to DE 10 2010 030 998 A1, which may be construed as part of the subject matter of this disclosure.

Furthermore, the contact line arrangements 67, 68 may be disposed on the first and second guide rails 27, 28 in such a way that they extend respectively inside the outer profiled cross-section bounding one of the first or the second guide rails 27, 28 and/or lie inside the profiled cross-section thereof. The contact line arrangements 67, 68 also extend at least across the respective longitudinal extension of the individual guide rails 27, 28. If several of the first and/or second guide rails 27, 28 are disposed extending longitudinally one after the other, the contact line arrangements 67, 68 respectively extend across their entire longitudinal extension and hence at least across the total possible travel path available to the conveyor vehicles 3a, 3b.

It is preferable if the first contact line arrangement 67 with its contact lines 69 forms both a first power supply bus and a first data bus and the second contact line arrangement 68 with its contact lines 70 forms both a second power supply bus and a second data bus. Accordingly, both motor and/or control currents as well as data transmission signals for the drive motor 65a and/or electronic control unit 66a of the first conveyor vehicle (3a) can be transmitted via the contact lines 69 of the first contact line arrangement 67. Independently of this, both motor and/or control currents as well as data transmission signals for the drive motor 65b and/or electronic control unit 66b of the second conveyor vehicle 3b can be transmitted via the contact lines 70 of the second contact line arrangement 68.

However, it would also be possible to use the contact line arrangement 67 exclusively for supplying the first conveyor vehicle 3a with data and the contact line arrangement 68 exclusively for supplying the second conveyor vehicle 3b with data. In this case, the respective conveyor vehicle 3a, 3b is equipped in such a way that the electric power needed for driving its drive motor 8a, 8b and actuating the load handling device 11a, 11b for transferring/depositing articles 2 between the storage space 17 and conveyor vehicle 3a, 3b is drawn from a separate storage device for the conveyor vehicle such as an accumulator, e.g. a capacitor such as a so-called PowerCap, so that the conveyor vehicle 3a, 3b can be supplied with power independently of the rails. The storage device is then recharged at irregular intervals for example, e.g. is controlled as a function of the charge level and optionally also depending on the work requirements placed on the conveyor vehicles 3a, 3b at any one time. The charging stations are disposed in the conveyor-elevator 5, for example, so that the storage device is recharged whenever the conveyor vehicle 3a, 3b is on the conveyor-elevator 5. However it is also possible for the charging stations to be installed in other positions in the storage rack 1, e.g. at individual positions in the rack stages 16 of the rack aisle 15 designated for this purpose.

As briefly described above already, the first guide rails 27 are mounted on the first shelf 12a and the second guide rails 28 are mounted on the second shelf 12b. The two guide rails 27, 28 in every rack stage 16 are disposed in mirror image relative to the longitudinal extension of the rack aisle 15 and each have the webs 23a, 23b, flanges 24a, 24b, 25a, 25b and guide webs 26a, 26b described above. The bottom flanges 25a, 25b are used to secure and/or retain the contact line arrangements 67, 68. Furthermore, the first conveyor vehicle 3a has a first guide device 9a and the second conveyor vehicle 3b has a second guide device 9b, which are disposed on the side of the conveyor vehicles 3a, 3b facing the respective guide rail 27, 28 in each case.

Each of the contact line arrangements 67, 68 in this instance respectively comprises an electric isolator, e.g.

made from plastic, and at most two contact lines 69; 70 electrically isolated from one another by the isolator, as may be seen in FIG. 6.

In order to obtain a clear allocation of the individual conveyor vehicles 3a, 3b to the respective first and/or second guide rails 27, 28 and the contact line arrangements 67, 68 disposed in and/or on them, the current collectors 71a and/or 71b must be mounted at only points of the respective conveyor vehicle 3a, 3b specifically designated for this purpose. This then results in a system of left and/or right conveyor vehicles 3a and/or 3b. For example, the current collector 71a of the first conveyor vehicle 3a may be disposed on that side of the conveyor vehicle 3a facing the first guide rail 27 with its first contact line arrangement 67. The other current collector 71b of the second conveyor vehicle 3b, on the other hand, is disposed on that side of the conveyor vehicle 3b facing the second guide rail 28 with its second contact line arrangement 68. The same also applies to the guide devices 9a, 9b described above.

As may be seen, therefore, the rack storage system uses two types of different conveyor vehicles 3a, 3b, even though this difference is merely the fact that the current collectors 71a, 71b are on the sides of the conveyor vehicles 3a, 3b facing away from one another. The first type of conveyor vehicle 3a (left conveyor vehicle) is provided with the current collector 71a on its left-hand side relative to the rack aisle 15 and the second type of conveyor vehicle 3b (right conveyor vehicle) is provided with the current collector 71b on its right-hand side relative to the rack aisle 15.

This differentiation is made by the control system.

To this end, the conveyor vehicles 3a, 3b may each be provided with at least one machine-readable identification tag (e.g. barcode or RFID), the data of which can be read by a reading device (e.g. barcode scanner or RFID reader). If a conveyor vehicle 3a, 3b has to be transferred by the conveyor-elevator 5 from one rack stage 16 to another rack stage 16 at a distance from it in the vertical direction, a false identification of a conveyor vehicle 3a, 3b can be prevented if the control system knows what type of conveyor vehicle 3a, 3b it is dealing with. The rack storage system comprises at least one initializer. In addition or as an alternative, the rack storage system may have at least one test reader. The initializer and optionally the test reader are connected to the control system.

In principle, it is possible that prior to activating the rack storage system, the conveyor vehicles 3a, 3b are unambiguously identified by the identification tag/initializer and the control system designates the conveyor vehicles 3a, 3b to be used in the rack storage system as being either a type based on the first conveyor vehicle 3a or a type based on the second conveyor vehicle 3b.

During operation, it may be of advantage if the conveyor vehicles 3a, 3b are identified by a test reader again before being transferred from one rack stage 16 to another rack stage 16 at a distance from it in the vertical direction. This will ensure that it is always the correct conveyor vehicle 3a, 3b (right/left conveyor vehicle) which is transferred by the conveyor-elevator 5 to the corresponding guide track. The test reader may be disposed on the conveyor-elevator 5 or along the rack aisle 15, for example.

During ongoing operation, on the other hand, the control system monitors the movements and transfer of the left/right conveyor vehicles 3a, 3b between the rack stages 16 solely by data tracking. An additional test reader can be dispensed with. A material flow computer is preferably used as the control system for this purpose. By data tracking is meant that the control system (material flow computer), having unmistakably identified a left/right conveyor vehicle 3a, 3b by means of the identification tag/initializer, constantly tracks the movements of the conveyor vehicles 3a, 3b as they move around the rack storage system. As a result, the control system knows at any one time which of the plurality of left conveyor vehicles 3a and the plurality of right conveyor vehicles 3b is on which rack stage 16 and/or on the conveyor-elevator 5.

By opting for 2-pole contact line arrangements 67, 68, only a relatively small amount of space is needed for installation. This advantageously means that the guide rails 27, 28 may also be designed with a very short height. For example, the height of the guide rails 27, 28 in the vertical direction is only 55 mm. One possible embodiment of such contact line arrangements 67, 68 is described in WO 2012/083333 A2, for example.

By supplying the individual conveyor vehicles 3a, 3b with power separately via the contact line arrangements 67, 68 extending separately from one another, voltage fluctuations and/or undersupply of the conveyor vehicles 3a, 3b with power can be prevented.

Based on one possible operating mode described in connection with the first embodiment (FIG. 1), in a first operating phase the first conveyor vehicle 3a serves the retrieval waiting device 43 for buffering one or more articles 2 to be retrieved. The second conveyor vehicle 3b, on the other hand, serves the storage waiting device 44 for buffering one or more articles 2 to be stored.

In a second operating phase, the first and the second conveyor vehicles 3a, 3b serve either the retrieval waiting device 43 for buffering one or more articles 2 to be retrieved or the storage waiting device 44 for buffering one or more articles 2 to be stored. During this, the first and second conveyor vehicles 3a, 3b are each supplied with power and/or data via the separate contact line arrangements 67, 68 each with their own contact lines 69, 70 independently of one another.

Switching between the operating phases is handled by the control system and may depend on performance requirements, for example. For example, if the retrieval rate needs to be increased, both conveyor vehicles 3a, 3b may serve the retrieval waiting device.

Based on another selected embodiment having optionally only one waiting device 43 or 44 on one of the sides of the article elevator device 34a, 34b or only one of the article elevator devices 34a or 34b, it is possible during a storage operation for at least one article 2 to be made available to the storage waiting device 43, 44 or to the first article elevator device 34a in one of the rack stages 16, picked up from there by the first conveyor vehicle 3a and buffered in a free storage space 17 in the same rack stage 16. Having been buffered there, this article 2 is then picked up by the second conveyor vehicle 3b. This free storage space 17 is then used as a "buffer space".

Based on a first possible embodiment, the buffered article 2 can be taken out of the buffer space 17 by the second conveyor vehicle 3b and then moved to the designated storage space 17 in this same rack stage 16, where it is set down. During this transport operation of the second conveyor vehicle 3b, the first conveyor vehicle 3a is already available for another storage and/or retrieval operation at the same time.

Independently of this, however, the article 2 could first of all be picked up by the second conveyor vehicle 3b and then moved to the conveyor-elevator 5. The second conveyor vehicle 3b with the article 2 disposed on it is then transferred by the conveyor-elevator 5 to a different rack stage 16 and the article 2 is moved to the designated storage space 17 in this other rack stage 16, where it is set down. During this operation, the first conveyor vehicle 3a is in turn available for another storage and/or retrieval operation which can be run simultaneously. This transfer of articles 2 may be used for so-called B and C articles for which storage and/or retrieval cycles need not be carried out so quickly.

The retrieval operation can then be run in the reverse sequence from that described above. Accordingly, the article or articles 2 are removed from the storage space 17 by the second conveyor vehicle 3b, then moved to a designated buffer space in this or another rack stage 16 and buffered there. The article 2 can then be taken out of this buffer space by the first conveyor vehicle 3a and either moved to an waiting device 43, 44; 72 or to an article elevator device 34a, 34b and deposited there.

Based on the different operating options described in detail above as well as the different embodiments of the article handling unit 4, different sequences can be run for storing and/or retrieving articles 2.

In the case of one embodiment (e.g. the embodiment illustrated in FIG. 1), the article handling unit 4 may comprise, in addition to the first article elevator device 34a, the first buffer device 35a with the retrieval waiting devices 43 disposed on one side of the first article elevator device 34a in the direction of the rack aisle 15 and in at least some of the rack stages 16 for buffering one or more articles 2 to be retrieved and, on the other side of the first article elevator device 34a in the direction of the rack aisle 15 and in at least some of the rack stages 16, the storage waiting devices 44 for buffering one or more articles 2 to be stored. In this case, the first conveyor vehicle 3a and the second conveyor vehicle 3b can be moved on at least one of the guide tracks in such a way that during a first operating phase, the first conveyor vehicle 3a serves the retrieval waiting device 43 for buffering one or more articles 2 to be retrieved and the second conveyor vehicle 3b serves the storage waiting device 44 for buffering one or more articles 2 to be stored.

During a second operating phase, in the rack stage 16 in which the conveyor vehicles 3a, 3b are disposed, the first conveyor vehicle 3a serves the storage waiting device 44 for buffering one or more articles 2 to be stored and the second conveyor vehicle 3b serves the retrieval waiting device 43 for buffering one or more articles 2 to be retrieved. Alternatively, during the second operating phase, in the rack stage 16 in which the conveyor vehicles 3a, 3b are disposed, either only the first conveyor vehicle 3a serves the storage waiting device 44 for buffering one or more articles 2 to be stored or only the second conveyor vehicle 3b serves the retrieval waiting device 43 for buffering one or more articles 2 to be retrieved. The latter may be of advantage in particular if, for example, a high retrieval rate is required so that in this rack stage 16 both the first conveyor vehicle 3a and the second conveyor vehicle 3b serve the retrieval waiting device 43. The main point is to ensure that the conveyor vehicles 3a, 3b operate without colliding.

The control system switches between the operating phases for the conveyor vehicles 3a, 3b. The control system can also control and/or coordinate the movements of the conveyor vehicles 3a, 3b disposed in one and the same rack stage 16 so that they do not collide.

If the article handling unit 4 comprises a first article elevator device 34a with a first buffer device 35a and a second article elevator device 34b with a second buffer device 35b on either side of the rack aisle 15 (e.g. as indicated by broken lines in the embodiment illustrated in FIG. 1), the retrieval waiting devices 43 and/or storage waiting devices 44 of the second buffer device 35b can be served by the conveyor vehicles 3a, 3b in the same manner as the first buffer device 35a.

Based on another embodiment (e.g. the embodiment illustrated in FIG. 7), the article handling unit 4 may comprise, on either side of the rack aisle 15, a first article elevator device 34a with a first buffer device 35a and a second article elevator device 34b with a second buffer device 35b. In this case, the first buffer device 35a has retrieval waiting devices 43 on one side of the first article elevator device 34a in the direction of the rack aisle 15 and in at least some of the rack stages 16 for buffering one or more articles 2 to be retrieved. The second buffer device 35b has storage waiting devices 44 on one side of the second article elevator device 34b in the direction of the rack aisle 15 and in at least some of the rack stages 16 for buffering one or more articles 2 to be stored. As a result, the first conveyor vehicle 3a and the second conveyor vehicle 3b can be moved on at least one of the guide tracks in such a way that in a first operating phase, the first conveyor vehicle 3a serves the retrieval waiting device 43 for buffering one or more articles 2 to be retrieved or the storage waiting device 44 for buffering one or more articles 2 to be stored. Either the article 2 to be stored can be transported from the storage waiting device 44 to one of the storage spaces 17 serving as a buffer space or the article 2 to be retrieved can be transported from the buffer space to the retrieval waiting device 43. Independently of the first conveyor vehicle 3a, the second conveyor vehicle 3b can transport the article 2 to be retrieved/stored between the buffer space and a predefined storage space 17. In a second operating phase, in addition to the first conveyor vehicle 3a, the second conveyor vehicle 3b also serves the retrieval waiting device 43 for buffering one or more articles 2 to be retrieved or the storage waiting device 44 for buffering one or more articles 2 to be stored. Based on a first embodiment, it is therefore possible either to transport the article 2 to be stored from the storage waiting device 44 to one of the storage spaces 17 serving as a buffer space or to a predefined storage space 17. Based on a second embodiment, the article 2 to be retrieved can also be transported from the buffer space or predefined storage space 17 to the retrieval waiting device 43. The control system switches between the operating phases for the conveyor vehicles 3a, 3b. The control system can also control and/or coordinate the movements of the conveyor vehicles 3a, 3b disposed in one and the same rack stage 16 so that they do not collide.

Based on another embodiment (e.g. the embodiment illustrated in FIG. 8), the article handling unit 4 comprises, in addition to the first article elevator device 34a, the first buffer device 35a with the waiting devices 72 on one side of the first article elevator device 34a and in at least some of the rack stages 16 for buffering one or more articles 2 to be retrieved and/or articles 2 to be stored. As a result, the first conveyor vehicle 3a and the second conveyor vehicle 3b can be moved on at least one of the guide tracks in such a way that in a first operating phase, the first conveyor vehicle 3a serves the waiting device 72 for buffering one or more articles 2 to be retrieved or articles 2 to be stored and either transports the article 2 to be stored from the storage waiting device 72 to one of the storage spaces 17 serving as a buffer space or transports the article 2 to be retrieved from the buffer space to the retrieval waiting device 72. The waiting device 72 is therefore used for both a storage operation and a retrieval operation. The second conveyor vehicle 3b, independently of the first conveyor vehicle 3a, can transport the article 2 to be retrieved/stored between the buffer space and a predefined storage space 17.

In a second operating phase, the second conveyor vehicle 3b can also serve the waiting device 72 for buffering one or more articles 2 to be retrieved or articles 2 to be stored and either transports the article 2 to be stored from the waiting device 72 to one of the storage spaces 17 serving as a buffer space or to a predefined storage space 17, or can transport the article 2 to be retrieved from the buffer space or predefined storage space 17 to the waiting device 72. The control system switches between the operating phases for the conveyor vehicles 3a, 3b.

Finally, it should be pointed out that the movements of the conveyor vehicles 3a, 3b moving on the guide rails 27, 28 of the same guide track in a rack stage 16 are coordinated in such a way that a collision is avoided, even if the travel ranges of the conveyor vehicles 3a, 3b intersect. This might be the case when the control system is switching between the first operating phase and second operating phase as explained in detail above.

This anti-collision system may be operated either by means of "internal" sensors 73a, 73b provided respectively on the conveyor vehicles 3a, 3b (as schematically indicated by broken lines in FIG. 9) and/or by means of an electronic route planning module (program logic) of the control system (not illustrated). Furthermore, the route planning module may also run a route optimization system for the conveyor vehicles 3a, 3b.

The sensor system 73a, 73b is connected to the electronic control unit 66a, 66b (FIG. 5) of the respective conveyor vehicle 3a, 3b. The first electronic control unit 66a of the conveyor vehicle 3a and the second electronic control unit 66b of the conveyor vehicle 3a, 3b are able to communicate respectively with the central control system and/or transmit data in two directions as described above. It is also possible for the first electronic control unit 66a of conveyor vehicle 3a and the second electronic control unit 66b of conveyor vehicle 3a, 3b to communicate with one another and transmit data between the conveyor vehicles 3a, 3b in two directions. The sensor system 73a, 73b of the conveyor vehicle 3a, 3b comprises at least one space measuring device and/or distance measuring device, for example an optoelectronic measuring system, in particular a laser or infrared measuring system or a triangulation sensor or such like, or an ultrasound sensor. Accordingly, the distance between the conveyor vehicles 3a, 3b is measured and a safe distance is maintained as conveyor vehicles 3a, 3b approach one another. It is therefore possible for the drive motors 65a, 65b to be controlled by the central control system and/or by the electronic control unit 66a, 66b as the conveyor vehicles 3a, 3b move increasingly close to one another in such a way that either both of the conveyor vehicles 3a, 3b are brought to a controlled halt and/or their speed is controlled, in particular reduced, or one of the conveyor vehicles 3a, 3b is brought to a controlled halt and/or its speed is controlled, in particular reduced. The conveyor vehicles 3a, 3b can be moved towards one another but not to the degree that they collide. Another option is to provide the conveyor vehicles 3a, 3b with a stop element on their mutually facing vehicle sides. The stop elements are preferably damping elements made from elastically flexible elastomers, in particular rubber, and act as elastic rubber buffers.

The "internal" sensor systems 73a, 73b of the conveyor vehicles 3a, 3b, for example infrared light barriers, may also use the data supply for controlling movement of the individual conveyor vehicles 3a, 3b and actuation of the actuator drive for the load handling device 11. The light barriers are therefore not only used for measuring distance with a view to preventing collisions, but also for wireless communications between the conveyor vehicles 3a, 3b and control system and/or wireless communications between the conveyor vehicles 3a, 3b.

Alternatively, the route planning module controls the movements and/or routes of the conveyor vehicles 3a, 3b depending on storage tasks and retrieval tasks in advance so that the travel ranges and/or routes of the conveyor vehicles 3a, 3b moving on the guide rails 27, 28 of the same guide track in a rack stage 16 do not even intersect. Optionally, the sensor system 73a, 73b described above may be used in addition to the route planning module. In this case, the movements of the conveyor vehicles 3a, 3b are evaluated by means of a displacement measuring system. The displacement measuring system comprises a displacement measuring device connected to the control system, for example a capacitive displacement recorder, inductive displacement recorder, magnetic displacement recorder or optoelectronic displacement recorder. The measuring method used for this purpose is absolute and incremental displacement measurement. The drive motor 8a, 8b and/or drive motor 65a, 65b is preferably equipped with a resolver and/or incremental encoder (and hence an "internal" sensor system 74a, 74b on the conveyor vehicles 3a, 3b, as schematically indicated in FIG. 5). By means of the displacement measuring device, the actual positions of the conveyor vehicles 3a, 3b moving on the guide rails 27, 28 of the same guide track in a rack stage 16 can be detected. The actual positions are transmitted to the route planning module either via the contact line arrangements 67, 68 or by the radio link incorporating the route planning module. The route planning module predefines the desired positions for the conveyor vehicles 3a, 3b. It would also be conceivable to use a barcode positioning system of a known type as the displacement measuring device. A collision between the conveyor vehicles 3a, 3b can be avoided by running a desired-actual comparison in the route planning module.

Another option for the path measuring system is a position locating system, not illustrated, in particular a navigation device in the form of GPS, to detect the actual positions of the conveyor vehicles 3a, 3b. To this end, the conveyor vehicles 3a, 3b are provided with a transmitter and/or receiver device (not illustrated) on the one hand and the control system is provided with a transmitter and/or receiver device on the other hand, across which a wireless data exchange takes place.

In principle, it is also possible to use the known system of automatic block signaling as a means of preventing collisions. Each of the guide tracks on which at least two conveyor vehicles 3a, 3b are operating simultaneously is sub-divided into a number of block sections. When two conveyor vehicles 3a, 3b are on the guide track, there will be two or a greater number of block sections, for example three. The conveyor vehicles 3a, 3b are operated on the basis of a first operating phase and a second operating phase and the travel ranges of the conveyor vehicles 3a, 3b intersect. The first block section extends along the storage shelves 12a, 12b and the second block section extends along the buffer device 35a; 35b. If buffer line sections 41a, 42a; 41b, 42b are provided on either side of the article elevator device 34a; 34b as illustrated in FIG. 1 or FIG. 9 for example, the first block section extends along the storage shelves 12a, 12b, the second block section extends along the buffer line section 42a; 41b and the third block section extends along the buffer line section 41 a; 42b. For every guide track on which at least two conveyor vehicles 3a, 3b are operated simultaneously, the rack storage system comprises an "external" sensor system (not illustrated) which defines the block sections. The "external" sensor system might be provided in the form of light barriers disposed at the ends of the block sections, a camera system for each block section and such like, for example. The "external" sensor system is connected to control system.

The way in which automatic block signaling operates will now be described with reference to FIG. 9. If the first conveyor vehicle 3a is on a guide track in buffer line section 41a; 42b moving along the first block section (first operating phase) and if the second conveyor vehicle 3b is travelling out of the second or third block section into the first block section, for example for a retrieval operation (second operating phase), the first conveyor vehicle 3a must have completely left the first block section first, before the second conveyor vehicle 3b can move into the first block section. The same applies if the second conveyor vehicle 3b is in buffer line section 42a; 41b along the second block section and the first conveyor vehicle 3a has to move out of the first or third block section into the second block section, for example for a retrieval operation (second operating phase). The presence of the first/second conveyor vehicle 3a; 3b in the first/second block section is detected by the "external" sensor system.

If, for example, storage/retrieval operations have to be carried out by both of the conveyor vehicles 3a; 3b, in which case the conveyor vehicles 3a; 3b in the third block section are storing articles 2 in storage rack 12a, 12b and/or retrieving them from storage rack 12a, 12b, the respective conveyor vehicle 3a; 3b moves out of the first/second block section into the third block section when the other conveyor vehicle 3a; 3b has left the third block section. The presence of the first/second conveyor vehicle 3a; 3b in the third block section is detected by the sensor system. In the case of longer tracks, the third block section may naturally be sub-divided into in several block part-sections and every block part-section is provided with an "external" sensor system.

What all of the embodiments have in common is that also after switching between the first and second operating phase, a minimum distance is maintained between the conveyor vehicles 3a, 3b being operated on a guide track simultaneously parallel with the aisle direction.

Finally, more details of the advantages/effects of the rack storage system will now be given.

In the case of long storage racks, the routes of the conveyor vehicles 3a, 3b can be significantly reduced, as may be seen in particular from FIG. 9. Furthermore, in every rack stage 16, articles 2 can be stored and/or retrieved by the (left-hand) first conveyor vehicle 3a in and/or from the (left-hand) storage shelves 12a, 12b on the left-hand side of the article elevator device 34a; 34b and articles 2 can be stored and/or retrieved by the (right-hand) second conveyor vehicle 3b in or from the (right-hand) storage shelves 12a, 12b on the right-hand side of the article elevator device 34a; 34b, and the conveyor vehicles 3a, 3b therefore operate independently of one another on the right-hand and/or left-hand side of the article elevator device 34a; 34b and simultaneously operate in storage mode and retrieval mode.

Regardless of the order situation (number of storage and retrieval operations) however, both of the conveyor vehicles 3a, 3b moving on the guide rails 27, 28 of the same guide track in a rack stage 16 are selectively able to handle (store and/or retrieve) articles 2 either between the (left-hand) buffer line section 42a; 41b and the (left-hand) storage shelves 12a, 12b or between the (right-hand) buffer line section 41a; 42b and the (right-hand) storage shelves 12a, 12b. This is done by switching between the first and second operating phase.

This enables so-called imbalanced loads to be compensated in the case of random storage.

By imbalanced loads is meant an uneven distribution of tasks for the conveyor vehicles 3a, 3b in terms of the (left-hand) storage shelves 12a, 12b on the left-hand side of the article elevator device 34a; 34b and (right-hand) storage shelves 12a, 12b on the right-hand side of the article elevator device 34a; 34b. For example, as illustrated in FIG. 9, for an operation of retrieving articles 2 from the (left-hand) storage shelves 12a, 12b, the (left-hand) second conveyor vehicle 3b "is relieved" when the (right-hand) first conveyor vehicle 3a is being used to retrieve articles 2 from the (left-hand) storage shelves 12a, 12b because the latter passes the article elevator device 34a; 34b and moves into the storage area of the (left-hand) storage shelves 12a, 12b. The same applies for an operation of storing articles 2 and for retrieving or storing from/in the (left-hand) storage shelves 12a, 12b. In other words, several conveyor vehicles 3a, 3b can also be used simultaneously on only one of the sides of the article elevator device 34a; 34b and thus where there is a relatively large number of orders.

Alternatively, in the case of optimized storage, it is possible to adapt the rate of retrieval or storage operations of articles 2 of different turnaround frequencies (A articles, B articles, C articles) between the right storage shelves 12a, 12b and left storage shelves 12a, 12b. For example, the (left-hand) first conveyor vehicle 3a can retrieve and/or store an article 2 of low turnaround frequency (C article) with a longer travel path at the same time as the (right-hand) second conveyor vehicle 3b is storing and/or retrieving an article 2 with a higher turnaround time (A article) with a shorter travel path. This being the case, the (left-hand) first conveyor vehicle 3a can store and/or retrieve an article 2 of lower turnaround frequency (C article) whilst the (right-hand) second conveyor vehicle 3b is retrieving and/or storing several articles 2 of a higher turnaround frequency (A articles) one after the other.

If a conveyor-elevator 5 is provided, based on one option, one or more conveyor vehicles 3a, 3b can be transferred between the rack stages 16, in which case at least one conveyor vehicle 3a, 3b will remain in every rack stage 16. This option is possible regardless of the order situation (number of storage and retrieval operations). The work rate can be very easily scaled as a result of this embodiment.

By predefining the routes for the conveyor vehicles 3a, 3b which can be operated on a guide track simultaneously, it is possible to set up a "logical separation" of the routes. This can be achieved by means of the route planning module. In other words, based on the embodiment illustrated in FIG. 1 or FIG. 9 for example, the first conveyor vehicle 3a can serve waiting device 43 exclusively and the second conveyor vehicle 3b can serve waiting device 44 exclusively. However, the way in which the waiting devices 43, 44 are operated can be changed, regardless of the order situation (number of storage and retrieval operations).

Based on the embodiment illustrated in FIG. 9, it would also be possible for the (left-hand) first conveyor vehicle 3a not just to handle articles 2 between the (left-hand) buffer line section 42a; 41b and the (left-hand) storage shelves 12a, 12b but also articles 2 between the (left-hand) buffer line section 42a; 41b and the (right-hand) storage shelves 12a, 12b. Similarly, the (right-hand) second conveyor vehicle 3b can handle articles 2 not just between the (right-hand) buffer line section 41a; 42b and the (right-hand) storage shelves 12a, 12b but also articles 2 between the (right-hand) buffer line section 41a; 42b and the (left-hand) storage shelves 12a, 12b.

The embodiments illustrated as examples represent possible variants of the rack storage system with the storage rack 1 and article handling unit 4, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the various examples of embodiments described may be construed as independent or inventive solutions in their own right.

The objective underlying the independent inventive solutions may be found in the description. Above all, the individual embodiments of the subject matter illustrated in FIGS. 1 to 9 constitute independent solutions proposed by the invention in their own right.

For the sake of good order, finally, it should be pointed out that, in order to provide a clearer understanding of the structure of the rack storage system with the storage rack 1 and article handling unit 4, it and/or its constituent parts are illustrated to a certain extent out of scale and/or on an enlarged scale and/or on a reduced scale.

LIST OF REFERENCE NUMBERS

| | |
|---|---|
| 1 | Storage rack |
| 2 | Article |
| 3 | Conveyor vehicle |
| 4 | Article handling unit |
| 5 | Conveyor-elevator |
| 6 | Base frame |
| 7 | Running wheel |
| 8 | Drive motor |
| 9 | Guide device |
| 10 | Guide wheel |
| 11 | Load handling device |
| 12 | Shelf |
| 13 | Telescopic arm |
| 14 | Driver |
| 15 | Rack aisle |
| 16 | Rack stage |
| 17 | Storage space |
| 18 | First storage rack side |
| 19 | Second storage rack side |
| 20 | Front beam |
| 21 | Rear beam |
| 22 | Cross-member |
| 23 | Web |
| 24 | Top flange |
| 25 | Bottom flange |
| 26 | Guide web |
| 27 | First guide rail |
| 28 | Second guide rail |
| 29 | |
| 30 | Guide frame |
| 31 | Lift drive |
| 32 | Handling device |
| 33 | Beam |
| 34 | Article elevator device |
| 35 | Buffer device |
| 36 | Conveyor device |
| 37 | Lift drive |
| 38 | Mast |
| 39 | Drive motor |
| 40 | Conveying direction |
| 41 | Buffer line section |
| 42 | Buffer line section |
| 43 | Waiting device |
| 44 | Waiting device |
| 45 | Pick-up section |
| 46 | Transfer section |
| 47 | Buffer section |
| 48 | Conveying direction |
| 49 | Pick-up section |
| 50 | Transfer section |
| 51 | Buffer section |
| 52 | Conveying direction |
| 53 | Switching region |
| 54 | Conveyor device |
| 55 | Conveyor device |
| 56 | Conveyor level |
| 57 | Conveyor level |
| 58 | Conveyor section |
| 59 | Conveyor section |
| 60 | Transfer lift |
| 61 | Conveyor device |
| 62 | Mast |
| 63 | Drive motor |
| 64 | |
| 65 | Drive motor |
| 66 | Electronic control unit |
| 67 | First contact line arrangement |
| 68 | Second contact line arrangement |
| 69 | Contact line |
| 70 | Contact line |
| 71 | Current collector |
| 72 | Waiting device |
| 73 | Sensor system |
| 74 | Sensor system |

The invention claimed is:

1. Automatic rack storage system comprising:
a storage rack comprising storage shelves, said storage shelves comprising storage spaces for articles in rack stages, said rack stages lying one above the other,
a rack aisle extending between the storage shelves and between first and second storage rack sides of the storage rack,
an article handling unit comprising at least a first article elevator device, the first article elevator device comprising a first conveyor device, wherein said first conveyor device can be raised and lowered for storing and/or retrieving articles,
a plurality of guide tracks running along the rack aisle in at least some of the rack stages, each guide track comprising a first guide rail and a second guide rail, the first and second guide rails of the respective guide track extending as far as the article handling unit or extending past the article handling unit,
at least a first conveyor vehicle and a second conveyor vehicle for conveying the articles between the storage shelves and the article handling unit, wherein the at least first and second conveyor vehicles are moved along the respective guide track on the first and second guide rails, and wherein each of the at least first and second conveyor vehicles respectively comprises a drive motor and an electronic control unit and can be controlled independently of one another, and
at least one conveyor system connected to the first article elevator device for conveying articles to or from the first article elevator device,
wherein the first guide rail is equipped with a first contact line arrangement and the second guide rail is equipped with a second contact line arrangement and each of the first and second contact line arrangements comprises separate contact lines, wherein the first conveyor vehicle contacts the contact lines of the first contact line arrangement via current collectors to obtain a power and/or data supply and the second conveyor vehicle contacts the contact lines of the second contact line arrangement via current collectors to obtain a power and/or data supply, and wherein the first conveyor vehicle and the second conveyor vehicle can be moved along at least one of the guide tracks on the first and second guide rails thereof simultaneously and independently of one another.

2. A rack storage system according to claim 1, wherein each of the first and second contact line arrangements respectively comprises an electric isolator and two separate contact lines electrically isolated from one another by the isolator.

3. A rack storage system according to claim 1, wherein the first contact line arrangement and corresponding contact lines exclusively form a first power supply bus, wherein the second contact line arrangement and corresponding contact lines exclusively form a second power supply bus, wherein motor currents and/or control currents for the drive motor and/or for the electronic control unit of the first conveyor vehicle can be transmitted via the first power supply bus, and wherein motor currents and/or control currents for the drive motor and/or for the electronic control unit of the second conveyor vehicle can be transmitted via the second power supply bus.

4. A rack storage system according to claim 3, wherein the electronic control unit of the first conveyor vehicle and the electronic control unit of the second conveyor vehicle are connected to a central control system via a common, wireless communication network, and wherein said communication network is a radio network that enables a two-way data transmission.

5. A rack storage system according to claim 1, wherein the first contact line arrangement and corresponding contact lines form both a first power supply bus and a first data bus, wherein the second contact line arrangement and corresponding contact lines form both a second power supply bus and a second data bus, wherein both motor currents and/or control currents as well as data transmission signals for the drive motor and/or for the electronic control unit of the first conveyor vehicle can be transmitted via the contact lines of the first contact line arrangement, and wherein both motor currents and/or control currents as well as data transmission signals for the drive motor and/or for the electronic control unit of the second conveyor vehicle can be transmitted via the contact lines of the second contact line arrangement.

6. A rack storage system according to claim 1, wherein the first guide rails are secured to a first shelf and the second guide rails are secured to a second shelf, wherein the first guide rails respectively comprise:
a projecting web facing the first shelf,
a top flange disposed at an angle with respect to the projecting web and having a horizontal running surface for running wheels of the first and second conveyor vehicles,
a bottom flange disposed at an angle to the projecting web, and
a guide web extending at an angle from the top flange in the direction towards the bottom flange and a guide surface for a first guide device of the first conveyor vehicle, wherein the second guide rails respectively comprise:
a projecting web facing the second shelf,
a top flange disposed at an angle with respect to the projecting web and having a horizontal running surface for running wheels of the first and second conveyor vehicles,
a bottom flange disposed at an angle to the projecting web, and
a guide web extending at an angle from the top flange in the direction towards the bottom flange and comprising a guide surface for a second guide device of the second conveyor vehicles, wherein the first and second contact line arrangements are each respectively arranged inside the profiled cross-section of the first guide rails and the second guide rails.

7. A rack storage system according to claim 1, wherein the current collector of the first conveyor vehicle is disposed on a side of the conveyor vehicle facing the first guide rail.

8. A rack storage system according to claim 1, wherein the current collector of the second conveyor vehicle is disposed on a side of the conveyor vehicle facing the second guide rail.

9. A rack storage system according to claim 1, wherein the article handling unit further comprises a first buffer device, wherein the first article elevator device and the first buffer device are disposed outside the rack aisle as a unit, and wherein the first buffer device comprises waiting devices in the direction of the rack aisle on one of the sides of the first article elevator device, said waiting devices being included in at least some of the rack stages for buffering one or more articles to be stored and/or retrieved.

10. A rack storage system according to claim 9, wherein the article handling unit further comprises:

a second article elevator device comprising a second conveyor device, wherein the second conveyor device can be raised and lowered for storing and/or retrieving articles, and a second buffer device, wherein the second article elevator device and the second buffer device are disposed outside the rack aisle as a unit, and wherein the second buffer device comprises waiting devices on one of the sides of the second article elevator device, said waiting devices being included in at least some of the rack stages for buffering one or more articles to be stored and/or retrieved.

11. A rack storage system according to claim 10, wherein the first article elevator device and the second article elevator device are installed spaced apart from one another by at least an aisle width, and wherein the first article elevator device and the second article elevator device are arranged opposite one another in mirror image.

12. A rack storage system according to claim 1, wherein the article handling unit further comprises a first buffer device, wherein the first article elevator device and the first buffer device are disposed outside the rack aisle as a unit, and wherein the first buffer device comprises
first waiting devices in the direction of the rack aisle on one side of the first article elevator device, said first waiting devices being included in at least some of the rack stages for buffering one or more articles to be stored and/or retrieved, and second waiting devices in the direction of the rack aisle on the other side of the first article elevator device, said second waiting devices being included in at least some of the rack stages for buffering one or more articles to be stored and/or retrieved.

13. A rack storage system according to claim 12, wherein the article handling unit further comprises:
a second article elevator device comprising a second conveyor device, wherein the second conveyor device can be raised and lowered for storing and/or retrieving articles, and
a second buffer device,
wherein the second article device and the second buffer device are disposed outside the rack aisle as a unit,
wherein the second buffer device comprises
first waiting devices in the direction of the rack aisle on one side of the second article elevator device, said first waiting devices being included in at least some of the rack stages for buffering one or more articles to be stored and/or retrieved, and
second waiting devices in the direction of the rack aisle on the other side of the second article elevator device, said second waiting devices being included in at least some of the rack stages for buffering one or more articles to be stored and/or retrieved.

14. A rack storage system according to claim 13, wherein the first article elevator device and the second article elevator device are installed spaced apart from one another by at least an aisle width, and
wherein the first article elevator device and the second article elevator device are arranged opposite one another in mirror image.

15. A rack storage system according to claim 1, wherein the article handling unit is disposed between the sides of the front storage rack and is integrated in into the storage shelves.

16. A rack storage system according to claim 1, wherein the article handling unit is adjoined to the first storage rack side of the storage rack.

17. A rack storage system according to claim 1, further comprising a conveyor vehicle-elevator for accommodating at least one conveyor vehicle, and
wherein the conveyor vehicle-elevator adjoins the second storage rack side of the storage rack.

18. A method of storing and retrieving articles from an automatic rack storage system, the automatic rack storage system comprising:
a storage rack comprising storage shelves, said storage shelves comprising storage spaces for articles in rack stages, said rack stages lying one above the other,
a rack aisle extending between the storage shelves and between first and second storage rack sides of the storage rack,
an article handling unit comprising at least a first article elevator device, the first article elevator device comprising a first conveyor device, wherein said first conveyor device can be raised and lowered for storing and/or retrieving articles,
a plurality of guide tracks running along the rack aisle in at least some of the rack stages, each guide track comprising a first guide rail and a second guide rail, the first and second guide rails of the respective guide track extending as far as the article handling unit or extending past the article handling unit,
a first contact line arrangement,
a second contact line arrangement, each of the first and second contact line arrangements comprising separate contact lines,
at least a first conveyor vehicle and a second conveyor vehicle for conveying the articles between the storage shelves and the article handling unit, wherein the at least first and second conveyor vehicles are moved on the respective guide track on the first and second guide rails, and wherein each of the at least first and second conveyor vehicles respectively comprises a drive motor, an electronic control unit, and current collectors and can be controlled independently of one another via a control system, and
a conveyor system connected to the first article elevator device for conveying articles to or from the first article elevator device,
wherein the method comprises steps of:
using the automatic rack storage system,
moving the first conveyor vehicle and the second conveyor vehicle on at least one of the guide tracks, and
during the moving, supplying the first and second conveyor vehicles with power and/or data independently of one another via the respective current collectors contacting the separate contact lines of the first and second contact line arrangements.

19. A method according to claim 18, wherein the article handling unit further comprises a first buffer device comprising:
retrieval waiting devices in the direction of the rack aisle on one side of the first article elevator device, the retrieval waiting devices being included in at least some of the rack stages for buffering one or more articles to be retrieved, and
storage waiting devices in the direction of the rack aisle on the other side of the first article elevator device, the storage waiting devices being included in at least some of the rack stages for buffering one or more articles to be stored,
wherein the moving of the first conveyor vehicle and the second conveyor vehicle on at least one of the guide tracks occurs in such a way that:
in a first operating phase, the first conveyor vehicle firstly serves a retrieval waiting device of the retrieval waiting devices and the second conveyor vehicle firstly serves a storage waiting device of the storage waiting devices, and
in a second operating phase at least one of the first and second conveyor vehicles secondly serves a retrieval waiting device of the retrieval waiting devices or a storage waiting device of the storage waiting devices, and
wherein the control system switches between the first and second operating phases for the first and second conveyor vehicles.

20. A method according to claim 19, wherein in the second operating phase, the first and second conveyor vehicles either serve a retrieval waiting device of the retrieval waiting devices or a storage waiting device of the storage waiting devices.

21. A method according to claim 18, wherein the first article elevator device further comprises a first buffer device,
wherein the article handling unit further comprises a second article elevator device comprising a second buffer device,
wherein the first article elevator device and the first buffer device are on a first side of the rack aisle and the second article elevator device and the second buffer device are on a second side of the rack aisle, wherein the first buffer device comprises retrieval waiting devices in the direction of the rack aisle on one side of the first article elevator device, the retrieval waiting devices being included in at least some of the rack stages for buffering one or more articles to be retrieved, wherein the second buffer device comprises storage waiting devices in the direction of the rack aisle on one side of the second article elevator device, the storage waiting devices being included in at least some of the rack stages for buffering one or more articles to be stored, wherein the moving of the first conveyor vehicle and the second conveyor vehicle on at least one of the guide tracks occurs in such a way that:

in a first operating phase, the first conveyor vehicle serves a retrieval waiting device of the retrieval waiting devices or a storage waiting device of the storage waiting devices and conveys the article to be stored either from one of the storage waiting devices to one of the storage spaces serving as a buffer space or conveys the article to be retrieved from the buffer space to a retrieval waiting device of the retrieval waiting devices, and the second conveyor vehicle, independently of the first conveyor vehicle, conveys the article to be retrieved/stored between the buffer space and a predefined storage space, and in a second operating phase, the second conveyor vehicle also serves a retrieval waiting device of the retrieval waiting devices or a storage waiting device of the storage waiting devices and either conveys the article to be stored from a storage waiting device of the storage waiting devices to one of the storage spaces serving as a buffer space or a predefined storage space, or conveys the article to be retrieved from the buffer space or predefined storage space to a retrieval waiting device of the retrieval waiting devices, and wherein the control system switches between the first and second operating phases for the first and second conveyor vehicles.

22. A method according to claim 18, wherein the article handling unit further comprises a first buffer device comprising waiting devices in the direction of the rack aisle on one side of the first article elevator device, the waiting devices being included in at least some of the rack stages for buffering one or more articles to be retrieved and/or articles to be stored, wherein the moving of the first conveyor vehicle and the second conveyor vehicle on at least one of the guide tracks occurs in such a way that:

in a first operating phase, the first conveyor vehicle serves a storage waiting device of the waiting devices for buffering one or more articles to be retrieved or articles to be stored and either conveys the article to be stored from a storage waiting device of the storage waiting devices to one of the storage spaces serving as a buffer space or conveys the article to be retrieved from the buffer space to a retrieval waiting device of the waiting devices, and the second conveyor vehicle, independently of the first conveyor vehicle, conveys the article to be retrieved/stored between the buffer space and a predefined storage space, and in a second operating phase, the second conveyor vehicle also serves a storage waiting device of the storage waiting devices and either conveys the article to be stored from a storage waiting device of the storage waiting devices to one of the storage spaces serving as a buffer space or a predefined storage space or conveys the article to be retrieved from the buffer space or predefined storage space to a storage waiting device of the storage waiting devices, and wherein the control system switches between the first and second operating phases for the first and second conveyor vehicles.

23. A method according to claim 18, wherein the movements of the first and second conveyor vehicles are monitored by an internal and/or external sensor system and/or an electronic route planning module in such a way that when switching between the first and second operating phase, a minimum distance is maintained between the first and second conveyor vehicles operating simultaneously on a respective guide track.

* * * * *

UNITED STATES PATENT AND TRADEMARK OFFICE
CERTIFICATE OF CORRECTION

PATENT NO.        : 9,764,900 B2
APPLICATION NO.   : 14/914700
DATED             : September 19, 2017
INVENTOR(S)       : Eric Grosse Page 1 of 1

It is certified that error appears in the above-identified patent and that said Letters Patent is hereby corrected as shown below:

In Column 31, Line 35 (Line 3 of Claim 15) after "integrated" please delete the word "in".

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*